US 6,304,376 B1

(12) United States Patent
Baun et al.

(10) Patent No.: US 6,304,376 B1
(45) Date of Patent: Oct. 16, 2001

(54) FULLY AUTOMATED TELESCOPE SYSTEM WITH DISTRIBUTED INTELLIGENCE

(75) Inventors: Kenneth W. Baun, Trabuco Canyon; John E. Smith, Mission Viejo; John E. Hoot, San Clemente; Michael A. Wachala, Riverside; Brian G. Tingey, Fountain Valley; Brent G. Duchon, Garden Grove; Stanley H. Dewan, Rancho Santa Margarita, all of CA (US)

(73) Assignee: Meade Instruments Corporation, Irvine, CA (US)

( * ) Notice: Subject to any disclaimer, the term of this patent is extended or adjusted under 35 U.S.C. 154(b) by 0 days.

(21) Appl. No.: 09/551,332

(22) Filed: Apr. 18, 2000

Related U.S. Application Data

(62) Division of application No. 09/428,865, filed on Oct. 26, 1999.
(60) Provisional application No. 60/143,637, filed on Jul. 14, 1999, and provisional application No. 60/105,626, filed on Oct. 26, 1998.

(51) Int. Cl.[7] .............................. G02B 23/00; H02P 1/00; G05G 5/00; G05B 5/00
(52) U.S. Cl. .......................... 359/429; 318/626; 318/266; 318/467
(58) Field of Search ..................... 359/429, 430; 250/201, 203.1; 318/626, 652, 286, 466, 467, 468, 469, 470, 266, 600, 625

(56) References Cited

U.S. PATENT DOCUMENTS

| | | | |
|---|---|---|---|
| 4,682,091 | 7/1987 | Krewalk et al. | 318/685 |
| 4,764,881 | 8/1988 | Gagnon | 364/559 |
| 5,555,160 | 9/1996 | Tawara et al. | 362/31 |
| 5,822,116 | * 10/1998 | Leblanc | 359/430 |
| 5,828,814 | 10/1998 | Cyman et al. | 395/102 |
| 5,912,541 | * 6/1999 | Bigler et al. | 318/625 |
| 6,108,277 | * 8/2000 | Whitmore | 368/18 |

* cited by examiner

Primary Examiner—Cassandra Spyrou
Assistant Examiner—Jennifer Winstedt
(74) Attorney, Agent, or Firm—Stradling Yocca Carlson & Rauth

(57) ABSTRACT

A fully automated telescope system is able to be fully operable in both Alt-Az and polar configurations. In either configuration, the telescope aligns itself to be celestial coordinate system following a simplified initialization procedure during which the telescope tube is first pointed north and then pointed towards a user's horizon. A command processor, under application software program control orients the telescope system with respect to the celestial coordinate system given the initial directional inputs. The initial telescope orientation may be further refined by initially inputting a geographical location indicia, or by shooting one or two additional celestial objects. Once the telescope's orientation with respect to the celestial coordinate system is established, the telescope system will automatically move to and track any desired celestial object without further alignment invention by a user.

31 Claims, 21 Drawing Sheets

Initiating Packet : Master to Target

| | |
|---|---|
| Byte 0 (>) - n | Count byte, n = 1 to 255 |
| Byte 1 (>) - A | Address select byte, A = 0 - 255: A = 0 = Broadcast |
| Byte 2 (>) - xx | Command byte, xx = content |
| • | Intermediate bytes, device unique |
| • | |
| • | |
| • | |
| Byte n (>) - xx | "Last" byte, device unique |

Response Packet : Target to Master

| | |
|---|---|
| Byte 0 (<) - n | Count byte, n = 1 to 254 |
| • | Intermediate bytes, device unique |
| • | |
| • | |
| • | |
| Byte n (<) - xx | "Last" byte, device unique |

FIG. 12

FULLY AUTOMATED TELESCOPE SYSTEM WITH DISTRIBUTED INTELLIGENCE

PRIORITY CLAIM

This application is a division of patent application Ser. No.09/428,865, filed Oct. 26, 1999, entitled "FULLY AUTOMATED TELESCOPE SYSTEM WITH DISTRIBUTED INTELLIGENCE" which takes priority from provisional patent application Ser. No. 60/105,626, filed Oct. 26, 1998 entitled "FULLY AUTOMATED TELESCOPE SYSTEM WITH DISTRIBUTED INTELLIGENCE" and provisional patent application Ser. No. 60/143,637, filed Jul. 14, 1999, entitled "SELF ORIENTING, SELF ALIGNING, INTUITIVE AUTOMATED TELESCOPE", the entire contents of which are expressly incorporated herein by reference.

CROSS-REFERENCE TO RELATED APPLICATIONS

The present application is related to co-pending application entitled UPGRADEABLE TELESCOPE SYSTEM and co-pending application entitled INTELLIGENT MOTOR MODULE FOR TELESCOPE AXIAL ROTATION, commonly owned by the assignee of the present invention, the entire disclosures of which are expressly incorporated herein by reference.

FIELD OF THE INVENTION

The present invention relates to telescopes or other observation instruments and, more particularly, it relates to fully automated telescope systems with distributed intelligence and control systems for such telescopes.

SUMMARY OF THE INVENTION

The present invention relates to fully automatic telescope systems which are capable of performing alignment and orientation operations under program control with a minimum of intervention by a user. The telescope system is able to perform its alignment and orientation functions regardless of whether it might be configured as an alt-azimuth telescope or as an equitorial telescope. In accordance with the invention, the system is provided with sufficient processing power and with a multiplicity of application routines so that alignment and orientation is performed with regard to a large number of different algorithms and with respect to a variety of user definable data type inputs. All that is required is that some location index be provided to the system and that the system's motors are initialized to a horizontal and vertical referant. Time might be included as an input parameter, whether user provided, or by automatic extraction from a peripherally coupled device. Location indices as well as horizontal and vertical referants might be user provided, obtained under user direction, or automatically obtained from various other peripherally coupled devices.

The telescope system has a distributed intelligence in that its motor control functions are independently developed by motor modules including a microcontroller, operating on motor movement commands received from a hand held command module, in combination with position feedback information derived from optical encoders coupled to each motor shaft. Alternatively, the encoders might be coupled to each of a telescope's two generally orthogonal axes, and encoder feedback signals directed to the motor module microcontrollers.

Distributed intelligence is further characterized in that the telescope system hand held command module might be provided in two separate configurations. A first configuration is simplified, and only provides direction and speed commands to the intelligent motor modules. System intelligence thus resides in the motor modules with the command module functioning more as a steering wheel, or directional joy stick.

In a second configuration, the command module is a fully functional microprocessor controlled command unit, capable of executing high level application software routines and performing numerous data processing tasks, such as numerical calculations, coordinate system transformations, database manipulations, and managing the functional performance of various different peripherally coupled devices.

A central interface panel is provided on the telescope system and supports interconnection between and among the intelligent motor modules, the command module (of either form) and peripheral devices. Communication between and among the component parts is made over serial data and control communication channels in accordance with a packet based serial communication protocol. An RS-232 port is also provided such that a command module is able to communicate with ancillary RS-232 capable devices like personal computer systems and/or a command module belonging to another intelligent telescope system according to the invention.

Use of the various communication channels allows the telescope system according to the invention to communicate with other devices in order to exchange stored information, exchange created and stored operating routines, obtain updates to programs and/or internal databases and the like. In this regard, the telescope system includes a number of internal databases, including at least one database of the celestial coordinates (RA and DEC) of known celestial objects that might be of interest to an observer. Further, the system includes a database of the geographical coordinates (Latitude and Longitude) of a large body of geographical landmarks. These landmarks might include the known coordinates of cities and towns, cartographic features such as mountains, and might include the coordinates of any definable point on the earth's surface whose position is stable and geographically determinable. Each of the databases are user accessible such that additional entries, of particular interest to a user, might be included.

The solution to any given problem in celestial trigonometry depends on being able to convert measurements obtained in one coordinate system (alt-az, for example) into a second coordinate system (the celestial coordinate system). The present invention relates to a system and method for orienting a computerized telescope system of the type including a telescope coupled for rotation about two orthogonal axes, with respect to a spherical coordinate system. The telescope is provided with a pair of motors, each motor coupled to rotate the telescope about a respective one of the orthogonal axes. Each motor further includes a positional reference indicator which defines an arcuate position of the telescope with respect to its corresponding axis. Positional reference information is taken from each positional reference indicator and provided to a control processor which is programmed to carry out the calculations necessary for effecting coordinate system transformation.

In a first line of procedure, the computerized telescope system is able to locate its own alignment stars based on date and time entries provided by a user during an initialization procedure. Specifically, the telescope is moved about one of its orthogonal axes until the telescope is pointed at a first positional reference. In one aspect of the invention, the first positional reference is North.

After the telescope system is pointed to the first positional reference, the arcuate position of that positional reference indicator is recorded and stored by the control processor so as to define a first reference position. Next, the telescope is moved about a second axis in order to position the telescope at a second reference point. In a particular aspect of the invention, the second reference point is the horizon, thus causing the telescope to be leveled. The arcuate position of the respective positional reference indicator is read and recorded to thereby define a second reference point.

Particularly, the positional reference indicators are position encoders of altitude and azimuth motor assemblies. Pointing the telescope North and leveling the telescope, functions to zero-in the position encoders of the altitude and azimuth motor assemblies. Any subsequent motion of the telescope away from its 0,0 position allows the telescope system to directly calculate its altitude and azimuth displacements from the 0,0 reference point.

Using time and date entries provided by a user, the telescope system consults a database of well known celestial objects and selects a particular bright object which is currently above the horizon. The entered time and date information allows the system to calculate whether that particular bright object has rotated sufficiently in right ascension to bring it above the observer's horizon, while a virtual latitude and longitude entry provided by an observer's entering a geographical indicia, provides the system with sufficient information regarding an observer's latitude such that it may calculate a declination value for the desired viewing object.

The system automatically slews the telescope to the vicinity of the desired viewing object by commanding the appropriate motion from the altitude and azimuth motors. Once the telescope has slewed to the vicinity of the desired star, the observer is prompted to center the star in the field of view of the telescope eyepiece. Once the star is centered in the field of view of the eyepiece, the system calculates the position and orientation of the telescope with respect to the night sky (the celestial sphere).

BRIEF DESCRIPTION OF THE DRAWINGS

These and other features, aspects and advantages of the present invention will be more fully understood when considered with respect to the following detailed description, appended claims and accompanying drawings wherein:

FIG. 3b is a semi-schematic block diagram of the signal and bus configuration of the electrical interface panel of FIG. 3a;

FIG. 5b is a semi-schematic block diagram of the electronic components of the embodiment of the semi-intelligent dual-axis drive motor motion control system of FIG. 5a;

FIG. 6b is a semi-schematic block diagram of the electronic components of the embodiment of the intelligent dual-axis drive motor motion control system of FIG. 6a;

FIG. 12 is an exemplary line listing of a communication packet in accordance with the interface protocol of the invention;

DETAILED DESCRIPTION

The detailed descriptions of a fully automated telescope system with distributed intelligence set forth below in connection with the appended drawings are intended only as a description of the presently preferred and illustrated embodiments of the invention, and are not intended to represent the only form in which the present invention may be constructed or utilized. The detailed descriptions set forth the construction and function of the invention as well as the sequence of steps utilized in the operation of the invention in connection with the illustrated embodiments. It is to be understood by those having skill in the art, that the same or equivalent of functionality may be accomplished by various modifications to the illustrated embodiments without departing from the spirit and scope of the invention.

A fully automatic telescope system with distributed intelligence and a control system for operating such a telescope will now be described with reference to the embodiments illustrated in the Figures.

Figure 1:
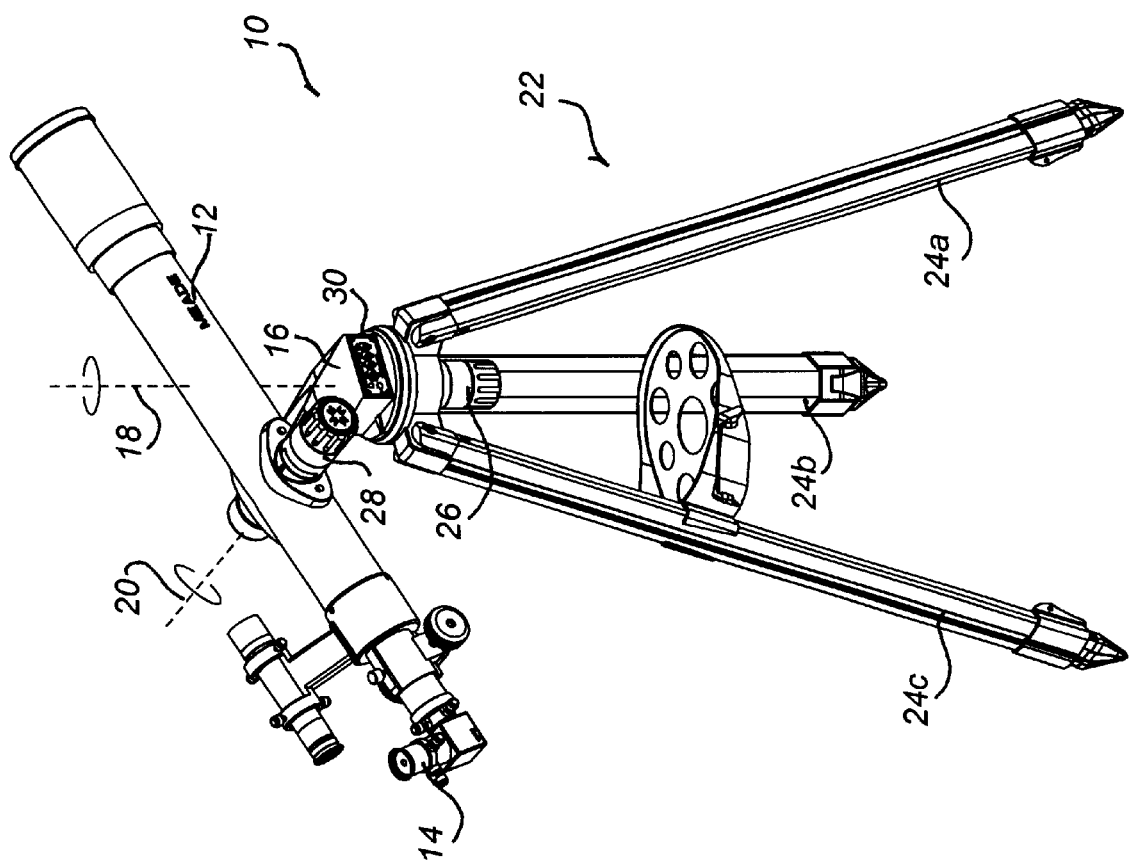
FIG. 1 is a semi-schematic perspective view of one embodiments of a telescope system in accordance with the present invention, configured in an initial, un-automated manner.

In FIG. 1, a telescope system 10 for observing celestial, and terrestrial, objects is provided in accordance with the present invention. The telescope system 10 suitably comprises a telescope tube 12 which houses the optical system required for resolving distant objects and including a focusing objective and eyepiece 14 coupled to the optical system in a manner to allow observation of the optical system's focal plane. The telescope tube 12 is supported by a mount 16 which facilitates movement to the telescope tube 12 about two orthogonal axes, a substantially vertical axis, termed an azimuth axis and a substantially horizontal axis, termed an altitude axis. As those having skill in the art will appreciate, the horizontal and vertical axes of the mount 16 in combination define a gimbaled support for the telescope tube 12 enabling it to pivot in a horizontal plane defined by the vertical (or azimuth) axis and, independently, to pivot through a vertical plane defined by the horizontal (altitude) axis.

It should be noted, at this point, that the telescope system 10 is illustrated as comprising a telescope tube 12 configured as a refracting-type telescope. However, the form of the telescope's optical system, per se, is not particularly relevant to practice of principles of the present invention. Thus, even though depicted as a refractor, the telescope system 10 of the present invention is eminently suitable for use with reflector-type telescopes. The specific optical systems used might be Newtonian, Schmidt-Cassegrain, Maksutov-Cassegrain, and any other conventional reflecting or refracting optical system configured for telescopic use.

In the telescope system embodiment illustrated in FIG. 1, it is convenient to support the telescope tube and mount combination in such a manner that the vertical axis 18 is, indeed, substantially vertical such that the telescope pivots (or rotates) about the vertical axis in a plane which is substantially horizontal. A tripod, indicated generally at 22, conventionally functions to support the mount 16 such that the azimuth axis 18 is substantially orthogonal to a horizontal plane, relative to a user of a telescope system. The tripod 22 includes three legs 24a, b, c, which are arranged in a triangular pattern. Each of the legs are independently adjustable for leveling the mount 16 regardless of the nature of the surface on which the telescope system 10 is used.

The illustrated embodiment of the telescope system of FIG. 1 is a manual, non-automatic embodiment in that the telescope tube 12 is pivotally moved about the azimuth axis 18 and altitude axis 20 by a user's grasping and manually moving an axially mounted azimuth control knob 26 and an axially mounted altitude control knob 28. Each of the control knobs 26 and 28 are journaled to respective axis pins through a conventional gearing system such that small and precise movements of the telescope tube 12 may be made about the azimuth and altitude axes 18 and 20 by relatively large rotations of the control knobs 26 and 28. In this respect, the telescope system 10 of FIG. 1 resembles a conventional, manually operated telescope system.

In addition to supporting telescope motion about two orthogonal axes, the mount 16 further comprises an electrical interface junction panel 30 which, in a manner to be described in greater detail below, is configured to support upgradeability of the telescope system 10 into a fully automatic telescope system with distributed intelligence, in a plurality of logically consistent steps, each of which results in a fully functional telescope system having greater or lessor degrees of intelligence and functionality, depending on where, along the upgrade spectrum, user achieves the most subjectively desirable ratio between system complexity and functional benefit.

Figure 2:
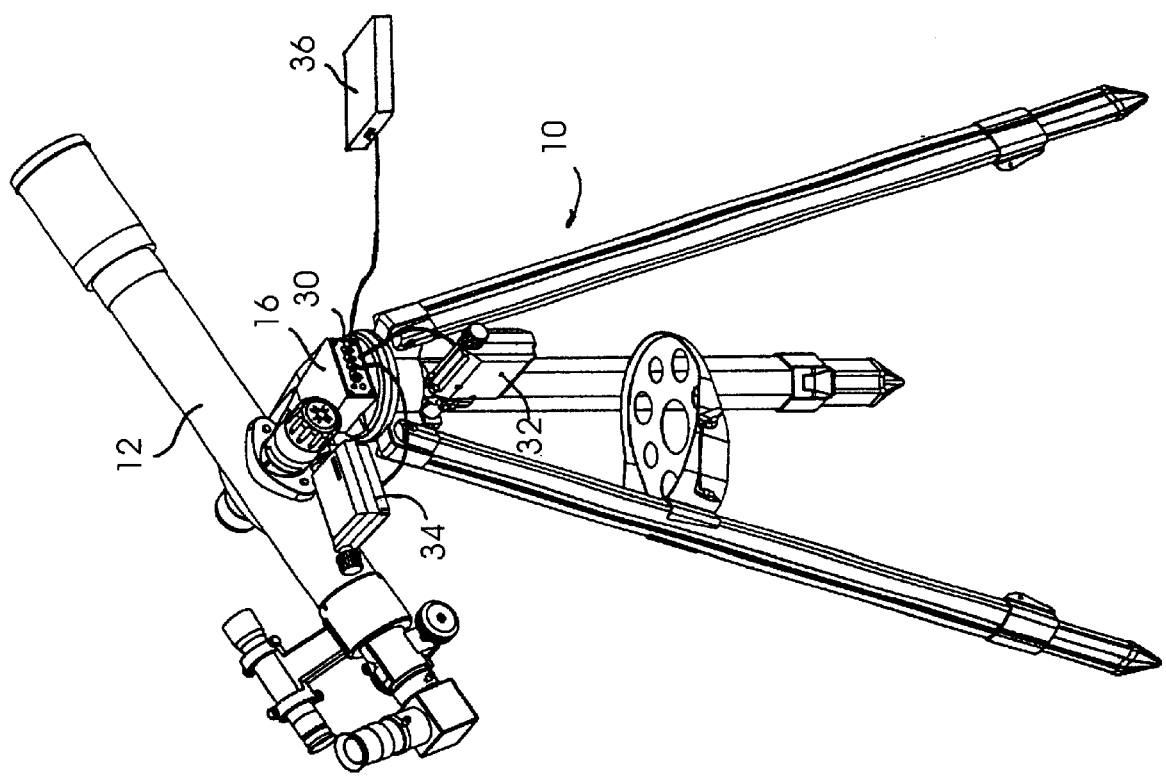
FIG. 2 is a semi-schematic perspective view of the telescope system of FIG. 1, including semi-intelligent drive motors coupled to the Telescope axes and illustrating alternative control systems.

Turning now to FIG. 2, there is depicted a semi-schematic perspective view of the telescope system 10 of FIG. 1, including semi-intelligent motor means for pivotally moving the telescope about the azimuth axis 18 and altitude axis 20. Semi-intelligent motor means suitably comprises a semi-intelligent, self-contained azimuth axis drive motor assembly 32 and a semi-intelligent, self-contained altitude axis drive motor assembly 34. Each of the drive motor assemblies 32 and 34 are self-contained motor packages including a DC brush-type motor, an associated electronics package hosted on a printed circuit board, a reduction gear assembly and an optical encoder assembly, configured together in a housing in a manner according to co-pending patent application entitled INTELLIGENT MOTOR MODULE FOR TELESCOPE AXIAL ROTATION, filed on instant date herewith and commonly owned by the Assignee of the present invention, the entire disclosure of which is expressly incorporated herein by reference. The semi-intelligent motor assemblies 32 and 34 are each affixed to the telescope mount 16 and coupled to the azimuth and altitude axes 18 and 20, respectively, so as to be able to pivotally move the telescope tube 12 about the corresponding axis when the motor assembly is activated. Each of the motor assemblies 32 and 34 are plugged into respective corresponding receptacles in the electrical interface junction panel 30 which, in a manner to be described in greater detail below, functions as a signal interface for the motor assemblies as well as providing power and ground thereto. The electrical interface junction panel 30 allows motor control signals to be directed to each of the motor assemblies 32 and 34, the motor control signals providing speed and direction information to the electronics package which, in turn, provides appropriate activation signals to the respective DC motor comprising the assembly. The electrical interface junction panel 30 further allows for signal communication between each respective one of the motor assemblies 32 and 34 and a hand-held system control unit 36.

In operation, a user plugs the hand-held system control unit 36 into an appropriate receptacle of the electrical interface junction panel 30 and further plugs the motor assemblies 32 and 34 into their respective receptacles, thus completing a signal path between each of motor assemblies and the system control unit 36. Motion commands are provided to the system by the user by accessing the appropriate function provided on the system control unit 36. Signals corresponding to the desired motion are directed by the control unit 36 to the appropriate motor assembly through the electrical interface junction panel 30. For example, if a user desires to slew the telescope in a counter-clockwise direction, he may enter a command into the control unit 36 telling the telescope system to move "left". In response, the azimuth axis motor assembly 32 is commanded to activate its integral motor to rotate in a particular direction, thus causing the telescope mount to pivot in a counter-clockwise fashion about the azimuth axis 18. In like manner, when a user desires to elevate the telescope tube 12 in an upwardly direction, the user would enter the appropriate "up" command into the control unit 36, thus activating the altitude motor assembly 34, which, in turn, causes the telescope to pivot upwardly about the altitude axis 20.

Figure 3A:
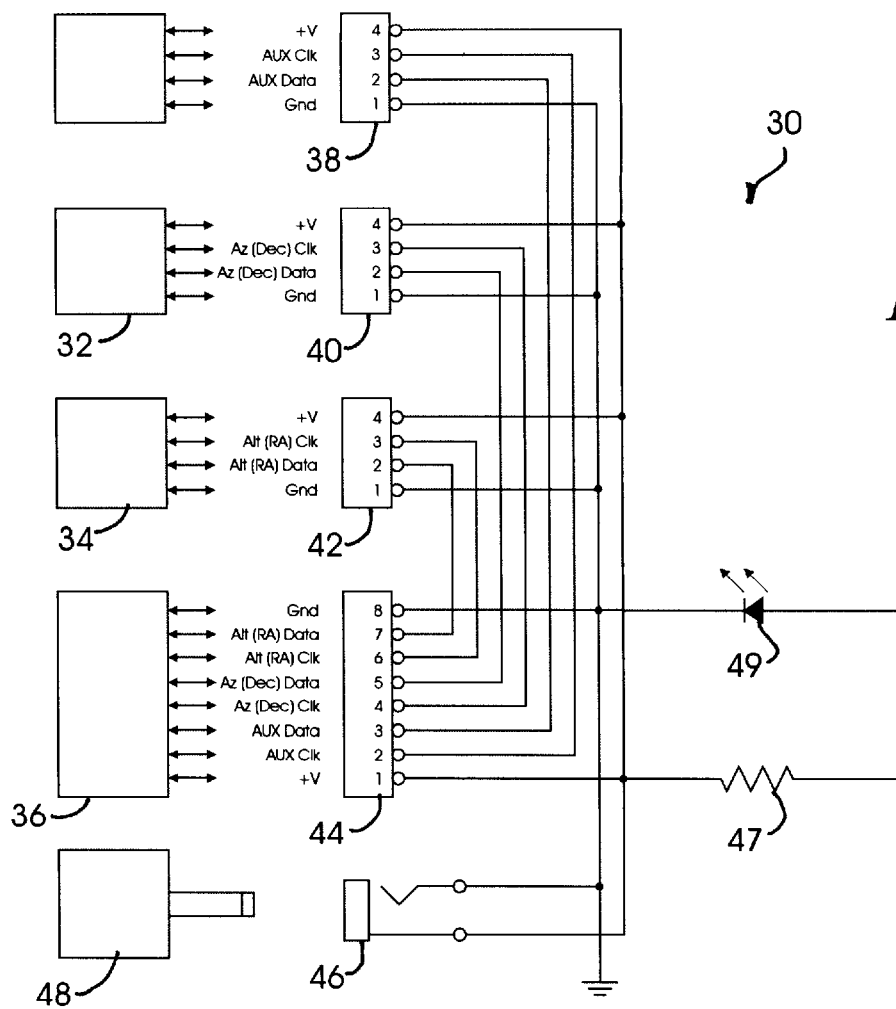
FIG. 3a is a semi-schematic partial perspective view of an electrical interface panel in accordance with the present invention.
Figure 3B:
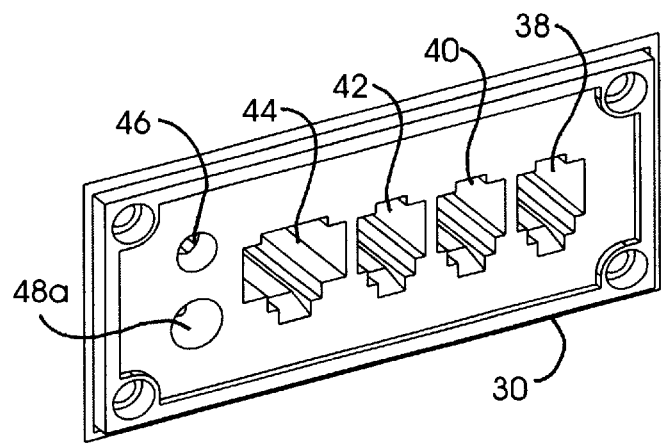

Turning briefly now to FIGS. 3*a* and 3*b*, the mechanical and electrical configuration of the electrical interface junction panel 30 are illustrated. As can be understood from FIG. 3*b*, the interface junction panel 30 suitably comprises four RJ11-type connector receptacles, with three of the receptacles 38, 40 and 42, comprising 4-pin RJ11 connectors and one of the receptacles 44, comprising an 8-pin RJ11 connector. In addition to the RJ11 connections, the electrical interface junction panel includes a "mini pin" type 12 volt power receptacle 46 and a visible "power present" indicator comprising an LED 49 mounted to shine through a recessed opening 48*a* in the panel located proximate to the power pin 46.

FIG. 3*a* illustrates the electrical connections made between and among the 4-RJ11 connectors, the 8-pin RJ11 connector and the 12 volt power pin 46. External power is supplied to the various connectors comprising the electrical interface panel 30 by a suitable 12 volt power source 48 which might comprise a dedicated 12 volt battery pack or, alternatively, an adaptor configured to mate with a 12 volt automotive battery through, for example, an accessory power plug or a cigarette lighter. The external power source 48 is plugged into the 12 volt power pin 46 which takes the 12 volt potential from the pin's center post and distributes it to pin 1 of the 8-pin RJ11 connector 44 and the No. 4 pin of each of the 4- RJ11 connectors 38, 40 and 42. The 12 volt potential is referenced to a return or ground potential, contacting a sleeve surrounding the center post, in conventional fashion, and the reference potential is directed to the No. 8 pin of the 8-pin RJ11 connector 44 and the No. 1 pin of the 4- RJ11 connectors 38, 40 and 42. In addition, the 12 volt supply is dropped across a series-configured resistor 47 and LED diode 48 combination such that the LED 49 emits when a power supply is present. Thus, a user is able to determine if the system is powered-up by examining the LED 48 disposed in the recessed opening 48*a* in the electrical interface junction panel.

In addition to power and ground, each of the 4- RJ11 connectors 38, 40 and 42 further comprise a 2-conductor serial signal path with pin No. 3 of each of the connectors identified to a serial signal termed "CLK" and pin No. 2 of each of the connectors identified to a serial signal termed "DATA". A first 4- RJ11 connector 38 is configured as a connector for supporting various pieces of auxiliary equipment and its serial signal lines are each identified as "AUX". The CLK and DATA signals comprising pins 3 and 2, respectively, are identified as AUX CLK and AUX DATA respectively. Likewise, the next 4- RJ11 connector 40 is configured to provide serial CLK and DATA signals to the altitude motor assembly 34 (alternatively a declination motor assembly) and its CLK and DATA signal lines are thus denoted ALT CLK (Dec CLK) and ALT DATA (Dec DATA) respectively. 4- RJ11 connector 42 is configured to provide serial CLK and DATA signals to the azimuth motor assembly 32 (alternatively a right ascension motor assembly) and its CLK and DATA signals are referred to respectively as AZ CLK (RA CLK) and AZ DATA (RA DATA).

Each of the respective CLK and DATA signals of each of the respective 4-RJ11 connectors are electrically connected to a corresponding CLK and DATA signal pin of the 8-pin RJ11 connector 44. Thus, the AZ CLK and AZ DATA signal pins of connector 42 are coupled to pin 6 and 7, respectively of the 8-pin RJ11 connector. ALT CLK and ALT DATA are connected to pins 4 and 5, respectively, of connector 44 and AUX CLK and AUX DATA are connected, respectively, to pins 2 and 3 of connector 44. The source of each of these signals suitably comprises the hand-held control unit 36 which provides such signals over a flexible 8 conductor cable terminating in a male 8-pin RJ11 connector suitable for mating with the 8-pin connector 44 disposed on the electrical interface junction panel 30.

Thus, it will be understood, that the electrical interface junction panel 30 provides a means for routing power and control signals between and among an external power source and a control unit, a plurality of separately provided motor assemblies and various optional auxiliary pieces of electronic equipment, such as electronic focusers, electronic leveling means, a global positioning system receiver, and the like, so long as the auxiliary electronic equipment is configured to communicate over a 2 conductor signal bus supporting clock and data signals.

The interface panel 30 can be viewed as essential distribution axis which enables interconnection between and among the various components of the automated telescope system through 2-conductor serial bus connections. Each 2-conductor serial bus carries packetized command and data signals on one wire and clock signals on the other. Each serial bus is coupled between an intelligent or semi-intelligent signal source, such as a system control unit (36 of FIG. 2) and either an axial drive motor assembly or an auxiliary apparatus. The 2-conductor serial cabling between and among the different components of the system is an important feature of the present invention, since it allows the components to be interconnected using small, thin, flexible cabling which is adapted for serial communication using a packet protocol. Commands and data are passed from device-to-device in "bite sized" packets which merely inform the receiving device of the commands which the device is to execute. Large, thick, byte-wide cabling, conventionally comprising a large number of conductors suitable for both address and data bus requirements, are no longer required in an intelligent telescope system according to the invention. Each of the novel components are suitably sized and provided with a suitable degree of intelligence so as to be quickly and simply coupled together with flexible serial interface cables in order to realize the benefits of the system as a whole.

It bears mentioning that the use of small, thin, flexible serial interconnect cabling significantly reduces the inertial drag on a system that would normally be present when using conventional multiple conductor cabling. In addition, the use of small, thin, flexible cables vastly reduces the spring tension that conventional motor and cable systems would apply to a telescope mount.

Figure 4A:
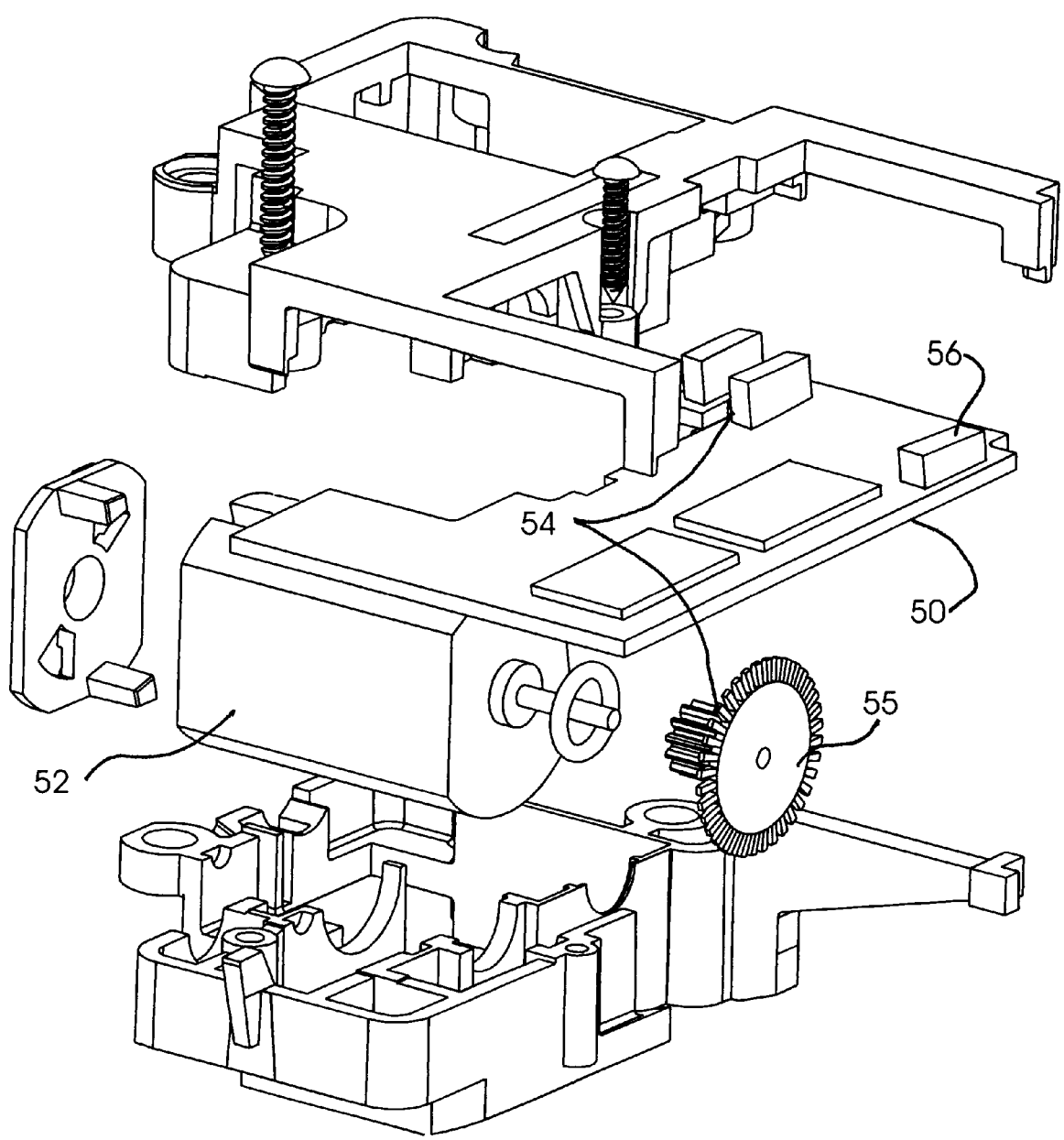
FIG. 4a is a semi-schematic exploded perspective view of a semi-intelligent motor assembly in accordance with the present invention.
Figure 4B:
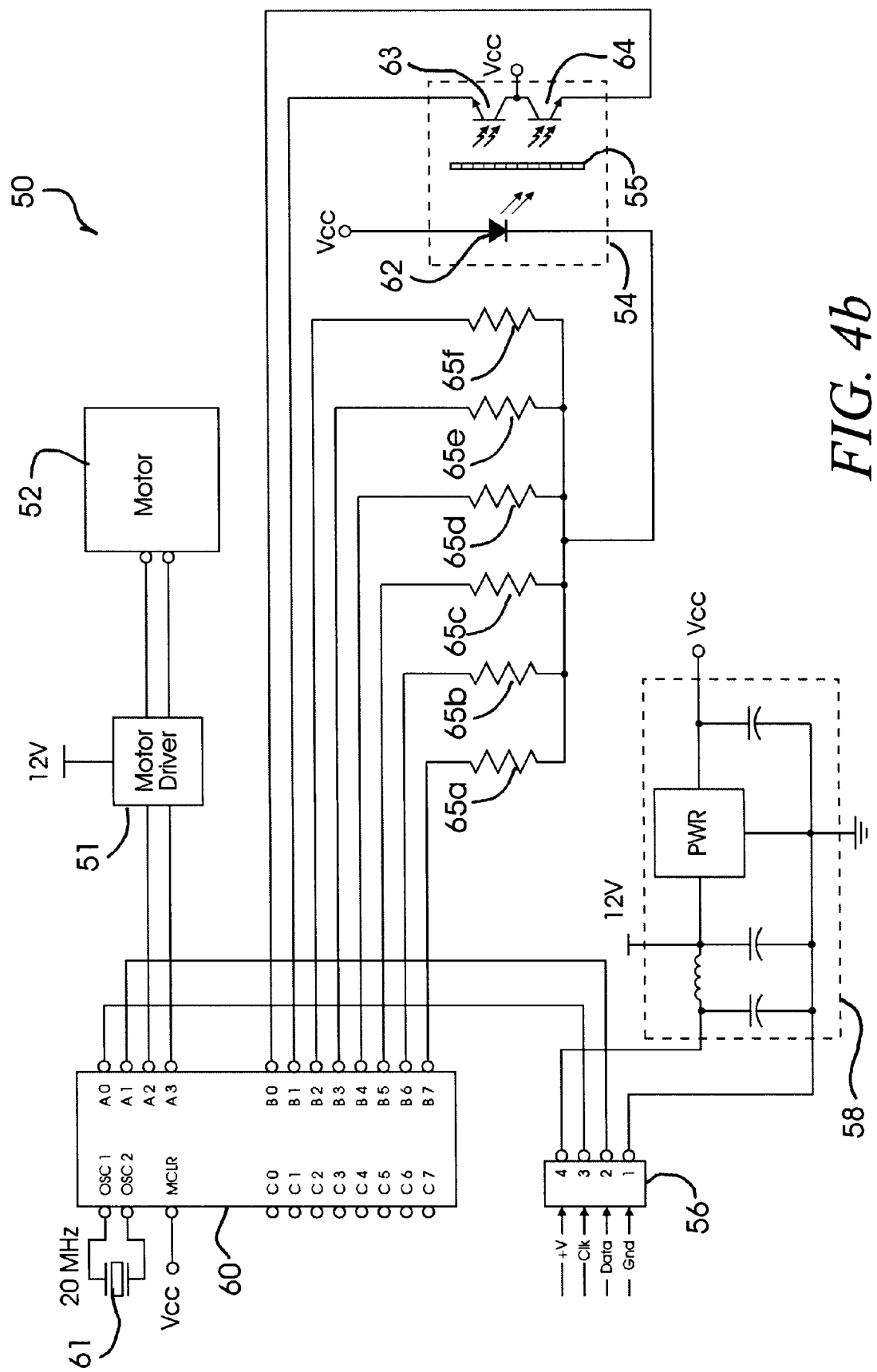
FIG. 4b is a semi-schematic block diagram of the electrical components of a semi-intelligent motor assembly in accordance with the present invention.

Pertinent to practice of principles of the present invention is the degree of intelligence which is provided to the motor assembly comprising either the azimuth or altitude axis motor assemblies 32 and 34 of FIG. 2. Referring now to FIGS. 4*a* and 4*b*, the intelligence of either of the motor assemblies is implemented in electronic circuitry 50 hosted on a printed circuit board which is disposed within the motor assembly housing along with at least a motor 52 and an optical encoder subsystem 54. The electronic circuitry 50 communicates with the outside world over a serial interface bus which is coupled to the circuitry through a 4-connector 56. The connector 56 is adapted to be cable connected to a control source through either the altitude motor RJ11 connector 40 or the azimuth motor RJ11 connector 42 as described in connection with the interface panel 30 of FIGS. 3a and 3b. Power and ground is taken from pins 4 and 1, respectively, of the connector 56 and routed to a power supply distribution circuit 58 wherein battery power is filtered and regulated to a nominal voltage level required by the circuitry, before being distributed to the active components comprising the circuit package 50. Additionally, the raw battery voltage is filtered and provided to motor driver circuitry 51 as well as to the respective motor 52. Power distribution circuit 58, thus is able to provide both regulated low voltages appropriate for an electronic circuit, and filtered high voltages suitable for motor applications. It should be understood that while 12 Volts is preferred as a battery supply voltage, the battery need not be limited thereto. So long as the motor and its associated driver circuitry are capable of operating at higher voltage levels, voltages as high as 16–18 Volts might be used.

The CLK and DATA lines of the serial interface are connected to respective inputs of a microprocessor 60 which functionally controls operation of its associated motor 52 under firmware program control. Microprocessor 60 is suitably implemented as an 8-microprocessor or controller, exemplified by the PIC16C54 microprocessor, manufactured and sold by Microchip Technology, Inc., and functions to control both direction of motion and speed of motion of its respective motor 52 by evaluating specific motor motion commands against a feedback signal provided by an optical encoder assembly 54.

Although the PIC16C54 is described as a microprocessor, it is technically an 8-bit, fully static, EPROM/ROM-based CMOS microcontroller employing a RISC architecture with 33 single word/single cycle instructions. The PIC16C54 uses a Harvard architecture in which program instructions and data are accessed on separate buses, thus improving bandwidth over traditional von Neumann architectures where program instructions and data are fetched on the same bus. The PIC16C54 comprises a 512×12 instruction EPROM/ROM memory for hosting an operational program instruction set and a 25 byte general purpose SRAM register file memory. Separating the program and data memory allows instructions to be sized differently than the 8-bit wide data byte. Instruction opcodes are 12-bits wide making it possible to have all instructions be single word-type instructions.

Conventionally, the PIC16C54 comprises three I/O ports, a 4-bit I/O register, termed port A and identified as pins A0 through A3, an 8-bit I/O register termed port B and identified as pins B0 through B7, and an 8-bit I/O general purpose register termed port C and identified as pins C0 through C7. All ports may be used for both input and output operation. Each of the I/O pins are tri-state, and can be programmed individually as either an input or an output.

As depicted in FIG. 4b, serial CLK and DATA inputs are directed to the bit-0 (A0) and bit-1 (A1) pins of the microcontroller's A port, respectively. Further, the bit-2(A2) and bit-3 (A3) pins of the microcontroller 60 define the motor motion control outputs and are directed to the motor driver circuit 51 and thence to the circuit's associated motor 52 in order to define the scope of motor movement and its direction. As will be described in greater detail below, the I/O pins B0–B7 of port B of the microcontroller 60 are programmed to receive feedback signals provided by an optical encoder assembly 54 which are processed in accordance with an application firmware program in order to define encoder and, thus motor position. Clock input and output pins (OSC1 and OSC2, respectively) are connected to a crystal oscillator 61, operating at four times the instruction cycle rate, or 20 MHz, and which defines the timing reference signals for the microcontroller 60.

Commands are provided in serial fashion to the data input A1 of the microcontroller 60 in accordance with a packet communication protocol, with each command packet comprising one or more bytes of information and with each information byte being sequentially clocked into the microprocessor 60, bit-by-bit, by a clock signal provided to the microprocessor's CLK pin A0. As will be understood by those familiar with the PIC16C45 I/O, data transmission is bi-directional, while clock signals are commonly sourced by a bus master device, such as a control unit, as will be described presently.

Exemplary commands that are received and processed by the microprocessor 60 include motor motion commands, more properly termed "step rate" commands, by which the microcontroller is instructed how fast, in which direction, and to what extent to move its associated motor. Since each motor is feedback controlled, feedback information, corresponding to actual motor movement, is stored in an "error count" register, internal to the microcontroller 60, whence it is available and may be read out to a follow-on processor for evaluation. Further commands that may be processed by the microcontroller 60 include commands for writing error count data to the register and reading microcontroller status information, including motor PWM count and the change in motor position since the last status read operation.

Other commands that are supported by the particular microcontroller 60 of the illustrated embodiment, include commands related to various power saving features commonly implemented in modern integrated circuits. In particular, a SLEEP command places the microcontroller in a "sleep" mode that terminates when the interface clock signal is next driven low. When in "sleep" mode, the watchdog timer, if enabled, will be cleared and the device's oscillator driver will be turned off. The I/O ports maintain the status they were in before the SLEEP instruction was executed, i.e., driving high, driving low, or hi-impedance (tri-state).

Upon receipt of a motor motion (or step rate) command, indicating that the electronic circuitry 50 is to command motor movement, operational firmware in the microcontroller 60 causes appropriate PWM signals to be provided to its corresponding motor driver circuitry and thence to the motor 52, at the appropriate pulse rate and duty cycle. The motor 52 moves in response to its motion command; the extent, direction and speed of which are evaluated by an optical encoder system 54 which provides motor positional feedback information in a closed-loop fashion.

In conventional, or classical, closed-loop control systems used in connection with automated telescope control, one or more position feedback sensors may be placed anywhere between the motor shaft and the telescope focal plane. Once a position feedback sensor is calibrated such that its output can be converted to an apparent stellar position, the sensor will automatically correct, through this calibration, for any systematic errors from the motor shaft up to the position feedback sensor.

In the particular embodiment of the present invention, the optical encoder assembly 54 comprises a disk 55 (best seen in FIG. 4a) about whose circumference a pattern of alternating transparent and opaque slots are disposed which, when rotated through the path of a light source and photodetector, are able to generate a series of pulses. The optical encoder disk is coupled to the shaft of a drive motor 52 in a manner as described in co-pending application entitled INTELLIGENT MOTOR MODULE FOR TELESCOPE AXIAL ROTATION, commonly owned by the Assignee of the present invention, the entire disclosure of which is expressly incorporated herein by reference. Since the motor 52 is coupled to its corresponding telescope axis by means of gears (cog and worm) there is no need to take drive train slippage into account as would be the case when using belts or friction transfer clutches. Accordingly, the optical encoder disk is able to be coupled directly to the motor shaft and still provide position information with sufficient accuracy to enable precise acquisition and tracking of stellar objects.

The optical encoder wheel 55 is disposed with respect to the motor circuit's circuit board such that its alternating teeth (or slots) are rotated through the path of a light source developed by an LED diode 62 and a pair of bipolar photodetector transistors 63 and 64. A pair of photodetector transistors is used in the illustrated embodiment of the invention in order to resolve incremental motor shaft angular displacement in quadrature. Thus, it will be understood that the encoder system according to the present invention is an incremental encoder system, as opposed to an absolute encoder system wherein the optical encoder disk patterns are defined by either binary or Gray codes.

Pulses, for each incremental resolved motor shaft angle step, are counted by the microcontroller 60 and the total encoder count value, representing full motion of the telescope about the axis, is evaluated against the movement extent command given to the corresponding motor. Accordingly, it can be seen that if a particular motor were commanded to rotate the telescope through fifty one seconds of arc in a positive (upwardly) direction, the microcontroller 60 is able to evaluate the optical encoder system 54 to determine that the motor did, indeed, move precisely that amount, no more and no less. If the measured motor motion were inconsistent with the commanded motor motion, the microcontroller 60 is able to calculate the direction and extend a subsequent motor command to move the motor (and thus the telescope) to its desired position.

The operation of the encoder system 54 will now be described in connection with the waveform diagrams of FIGS. 7a, 7b and 7c. In addition, it will be evident to those having skill in the art that the separation distance between the circumferentially disposed teeth of the optical encoder wheel 55 is mapped to the linear displacement distance separating the photodetector transistors 63 and 64, such that as the optical encoder wheel is rotated before the photodetectors, each respective photodetector will define a periodic output signal representing increasing and decreasing brightness of a light source emitted by the LED diode 62. It should be further noted that the periodic signals are 90° out-of-phase so as to define a signal in quadrature.

Figure 7A:
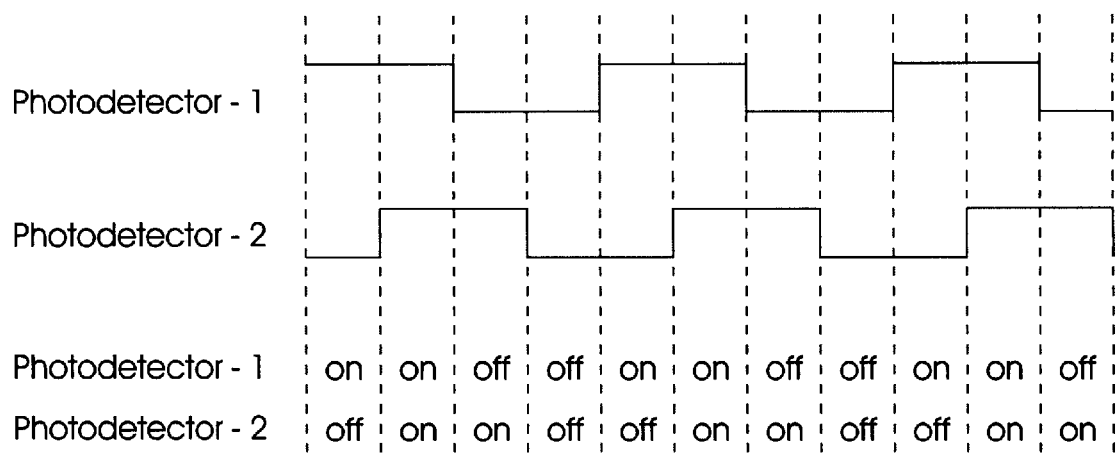
FIG. 7a is a simplified waveform diagram of ideal photodetector output characteristics, illustrating a quadrature output pattern.

The most desirable signal characteristics, albeit not realizable in the physical world, are depicted in the waveform diagram of FIG. 7a. The output signal from each of the photodetectors is illustrated as a squarewave with a 50% duty cycle, with the output signal from photodetector No. 2 being 90° behind the output signal from photodetector No. 1. Evaluating both of the output signals in combination, it will be evident that there are four separate combinations of values for the signals, with the four combinations repeating in time in a periodic fashion. The four possible combinations of signal values are: on-off, on-on, off-on and off-off. Because the signal combinations appear in a particular, predetermined pattern, the direction of motion of the encoder wheel 55 and, thus, the motor, can be determined by evaluating the development of the patterns. For example, for a given on-off initial phase state, if the pattern transitions to an on-on phase state, the motor is moving in a forward direction. If the on-off phase state transitions to an off-off phase state, the motor is moving in the opposite (presumably) backward, direction. Further, each phase state transition defines what is termed herein a "tick" and defines ¼ of the angular rotation required to rotate the encoder wheel 55 from a first tooth to the next tooth (1 period).

The definition of "on" and "off" is predicated on a photodetector output signal passing between two pre-set threshold voltages. As seen in FIG. 7b, each photodetector output signal defines a periodic waveform, which, in a manner to be described in greater detail below, is adjusted to oscillate within a particular voltage envelope. In accordance with practice of the invention, each photodetector signal is defined to be in the "on" state when its voltage excursion reaches and exceeds a 2.0 volt threshold level. Each photodetector remains in the "on" state until its signal level drops to a value of approximately 0.8 volts, whence the photodetector output is deemed to switch from the "on" to the "off" state. The photodetector remains in the "off" state until its voltage value again reaches the 2 volt threshold level, whence it switches to the "on" state. Accordingly, it can be seen that each of the signals from the respective photodetectors define alternating "on" periods and "off" periods so as to define quadrature patterns.

Figure 7B:
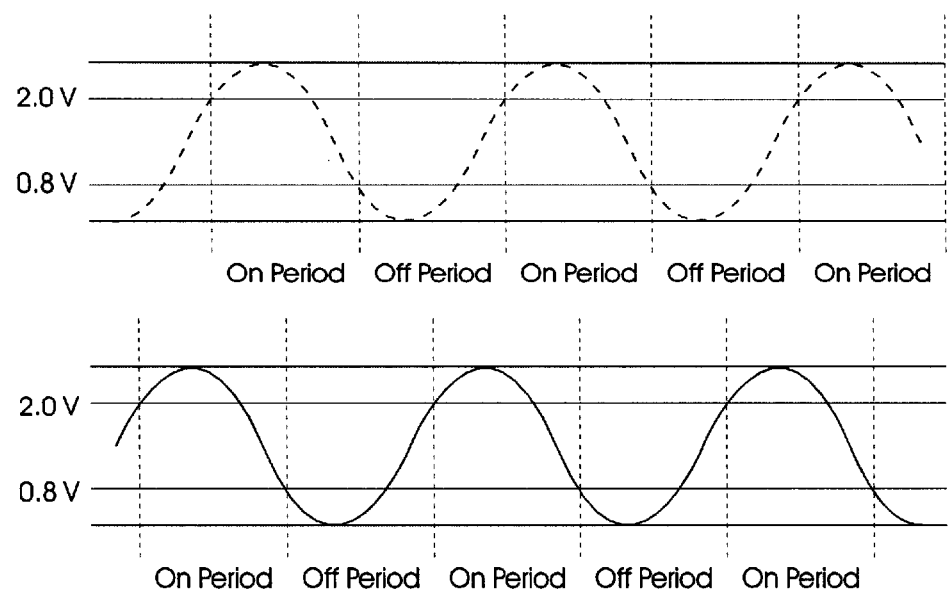
FIG. 7b is a simplified waveform diagram illustrating photodetector "on" and "off" periods in accord with the invention.
Figure 7C:
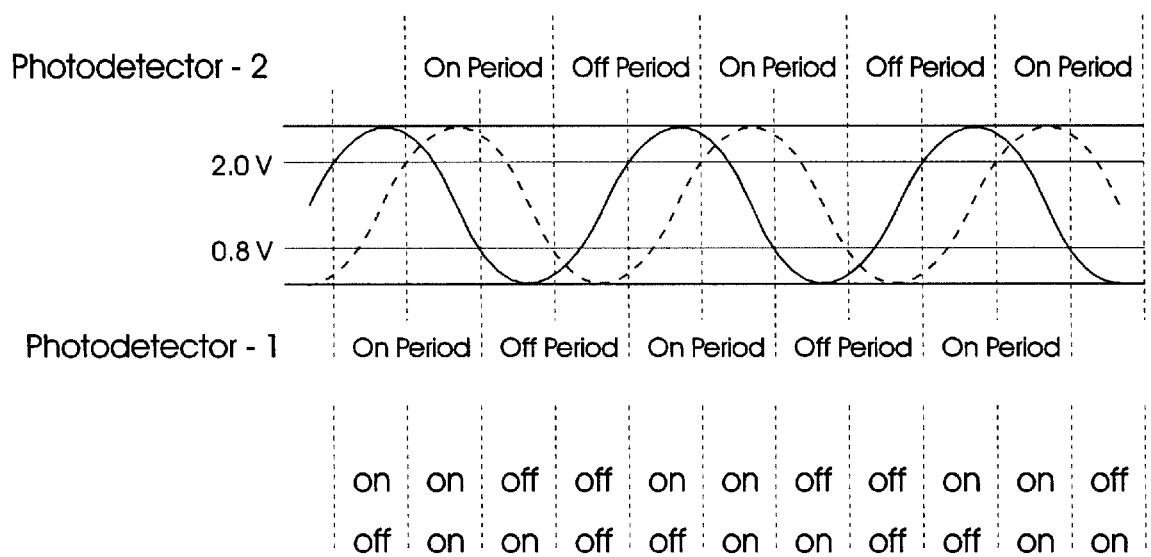
FIG. 7c is a simplified waveform diagram depicting dynamically tuned photodetector output characteristics, exhibiting an ideal quadrature output pattern.

In FIG. 7c, the periodic signals from the two photodetectors of FIG. 7b, have been superposed, so as to define the quadrature pattern: on-off, on-on, off-on and off-off.

Returning to FIG. 4b, the photodetector transistor 63 and 64 are preferably implemented as MPN transistors with their collector terminals connected in common to $V_{cc}$ and their respective emitter terminals coupled to I/O pins B0 and B1 of the microcontroller 60. The microcontroller is thus able to count each of the quadrature ticks and evaluate the quadrature pattern so as to determine both motor speed and motor direction by evaluating each photodetector's output. As regards motor movement commands, the microcontroller 60 is configured to provide PWM signals to the motor driver 51 which, in turn, supplies appropriate motor rotation signals to its associated motor 52. The microcontroller 60 outputs PWM signals (pulses) at a 150 pulse per second repetition rate and determines actual motor speed by varying the duty cycle of each pulse. For example, to run the motor at its maximum speed, the duty cycle for each pulse would be set to approximately 99%, i.e., substantially always on, and the repetition rate set at the maximum 150 pulses per second rep rate. In contrast, were the microcontroller 60 commanded to run the motor 52 at a sidereal rate, the microcontroller 60 would issue PWM pulses to the motor driver 51 having an approximately 2% duty cycle and at a substantially slower repetition rate. In this regard, it should be noted that when running at the sidereal rate, the PWM pulse rate should equal or exceed approximately 45 pulses per second in order that the resulting telescope motion not be apparently jerky to the human eye. It has been established that step-wise motion at repetition rates exceeding 45 repetitions per second appears smooth and continuous to the human eye. Thus, PWM pulse rates should meet or exceed this 45 pulse per second repetition rate and the motor mechanical gearing system adjusted accordingly. Given the maximum PWM pulse rate of 150 pulses per second, it will be understood that the maximum pulse repetition rate defines a minimum time window between like pulse transition edges of approximately 6 milliseconds. In order to determine motor speed, the microcontroller 60 counts the number of "ticks" it receives from the optical encoder system within the 6 millisecond timing window. The microcontroller evaluates the number of ticks received in the window against the number of ticks expected and, if the number of ticks received is greater than or less than the number of ticks expected, establishes an error count in an internal register. The microcontroller then adjusts the motor pulse duty cycle in order to slow-down or speed-up the motor in response to the magnitude and sign of the error count. The resulting ticks are again compared to a nominal established value, with excess ticks being added to the error count register and the shortfall being subtracted therefrom. The process continues until the error register is substantially zeroed-out, meaning that the motor is now running at its expected rate. In addition to evaluating motor speed, the microcontroller 60 further stores the number of "ticks" it has commanded the motor to move during the entire motor movement operation in a separate internal register. Thus, from the beginning of a motor movement command to the end, the microcontroller maintains a record of the total number of ticks the motor has moved through. This internal register is available for periodic interrogation by a separate control unit which, in a manner to be described further below, can translate the tick count into telescope angular displacement about an axis and, thus, the position vector of the telescope system.

In addition to commanding motor movement and evaluating optical encoder feedback signals, the microcontroller 60 may maintain the last-commanded motor motion in a data field defined in RAM memory. This last-commanded motor motion (the delta from the next-most previous motor motion command) is maintained in RAM and is also available for access by a system controller by providing the appropriate memory access command to the microcontroller 60. Thus, the motor control electronics comprising the electronics package 50 of the present invention can be seen to comprise means for acquiring, storing and recalling motor position information of its corresponding motor and, thus, the position of the telescope with respect to the corresponding axis.

An additional feature of the motor control circuitry comprising the electronics package 50 is its ability to intelligently evaluate the correspondence between a motor movement command and actual motor motion as read from the optical encoder system 54. In particular, the microcontroller 60 includes firmware that evaluates a motor PWM pulse against ticks received from the optical encoder system 54 in order to determine that the motor is, indeed, moving. A PWM threshold is set within the firmware such that if the PWM threshold is reached without the microcontroller's having received any corresponding motion ticks from the optical encoder system, the motor is deemed "locked" or "burnt-out" and the microcontroller ceases to issue any further motion commands until reset. Thus, it will be seen that the circuitry comprising the electronics package 50 includes means allowing for an intelligent evaluation of motor PWM commands versus encoder movement response metrics in order to determine possible motor lock or burnout.

An additional feature implemented in the exemplary electronics package 50 is an ability to adaptively tune the brightness of the optical encoder LED diode 62 in order to provide for optimal squareness and amplitude characteristics of the photodetector signal received by the microcontroller 60. Specifically, LED brightness is adaptively tuned by switching one or more of five parallel-connected resistors into the LED current path between $V_{cc}$ and a microcontroller input. Five resistors, 65a through 65f, are parallel-connected in common to the LED diode 62 at one end. The other end of each of the resistors, 65a–65f, are connected to respective I/O pins (B2 through B7) comprising the B port of the microcontroller 60. One or more of the resistors are selectively incorporated into the LED circuit by selecting their respective I/O pins as active.

LED brightness is considered optimized when a particular photodetector output signal is evaluated as "on" approximately 50% of the time and "off" approximately 50% of the time. This condition is obtained when the amplitude of each photodetector signal is such that it at least exceeds the 2 volt threshold and is not sufficiently strong that it "bleeds" over the 0.8 volt "off" threshold. In other words, if the signal amplitude is too low, the photodetector is not able to "turn on". Conversely, if the signal amplitude is too high, i.e., the signal is saturated, the photodetector will not be able to "turn off".

Figure 8:
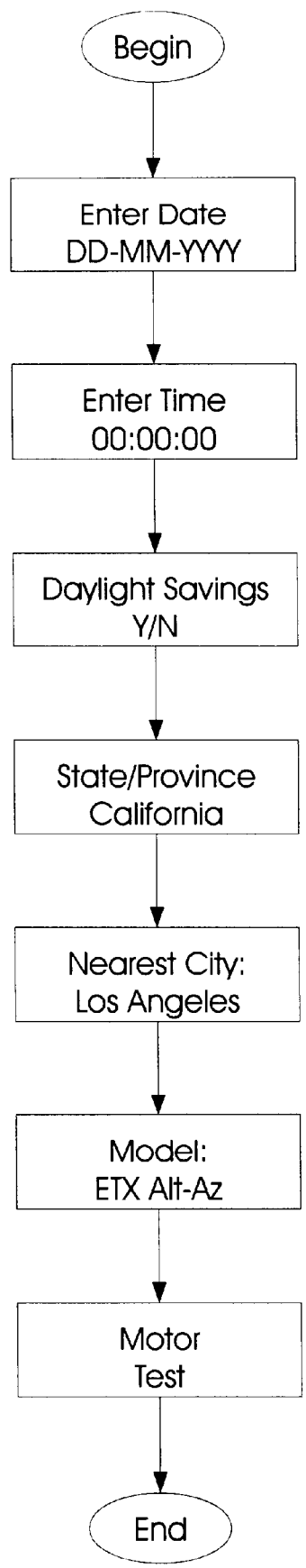
FIG. 8 is a conceptual flow diagram of an initialization procedure in accordance with the invention.

LED brightness is optimized by a firmware routine that is invoked during an initialization procedure when the telescope system is started-up. Specifically, as depicted in the flow diagram of FIG. 8, the microcontroller 60 first causes its associated motor to spin-up and move at a pre-determined speed in a pre-determined direction, for a pre-determined period of time. During this period, the microcontroller 60 evaluates the output of a single one of the photodetectors and determines the effective duty cycle of the photodetector output signal.

If the perceived signal duty cycle was such that the photodetector is "on" for a longer period of time than it is "off", the microcontroller concludes that LED brightness is greater than a desired, nominal value. In contrast, if the effective signal duty cycle is such that the photodetector is "off" for a longer period of time than it is "on", the microcontroller concludes that LED brightness is lower than its desired, nominal value. In response, resistors 65a through 65f are selectively enabled into the LED circuit. Following each resistor reconfiguration, the microcontroller again evaluates the effective duty cycle of photodetector signal until the effective duty cycle reaches the desired 50% point. Once the desired LED brightness characteristic has been achieved, the microcontroller 60 reviews the register state corresponding to the B2 through B7 inputs. The register state for each pin will have a particular value depending on whether the I/O for that pin is active, inactive or tri-state. The register state defining the pin activation configurations required to return the necessary detector output characteristics is passed, as an initialization I/O configuration value to an external system controller where it is stored in non-volatile memory for future reference. Alternatively, the I/O configuration of the microcontroller required to return the necessary detector output characteristics might be saved into the microcontroller's REM memory as an I/O configuration value from where it might be retrieved upon interrogation by an external system controller. Regardless of how saved and where it eventually resides, the I/O configuration value is available to be passed to the motor microcontroller each time the telescope system is initialized. The I/O configuration value need only be obtained once, when the telescope system is first set up for use. The I/O configuration may, however, be reobtained and/or recalculated upon a user's initiative, in order to account for the gradual roll-off in LED output strength over long periods of time. This would be useful to observers who use their telescope systems on an almost continuous basis and who require the greatest precision in automatic motor control performance.

Thus, it will be understood that the microcontroller 60, in combination with resistors 65a through 65f, the LED diode 62 and photodetector transistors 63 and 64, comprise means for adaptively tunning LED brightness characteristics in order to obtain optimal photodetector output signal squareness and amplitude characteristics. Optimal output signal characteristics are an important feature of the present invention since it enables motor speed and direction evaluations to be made with a significantly greater degree of precision and accuracy than with conventional systems.

Figure 5A:
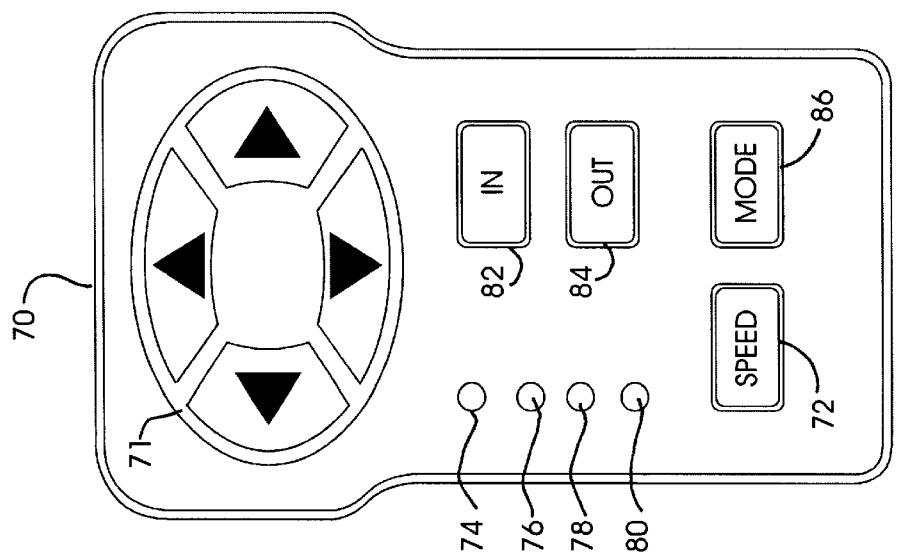
FIG. 5a is a semi-schematic front view of an embodiment of ma semi-intelligent dual-axis drive motor motion control system according to practice of principles of the present invention.
Figure 5B:
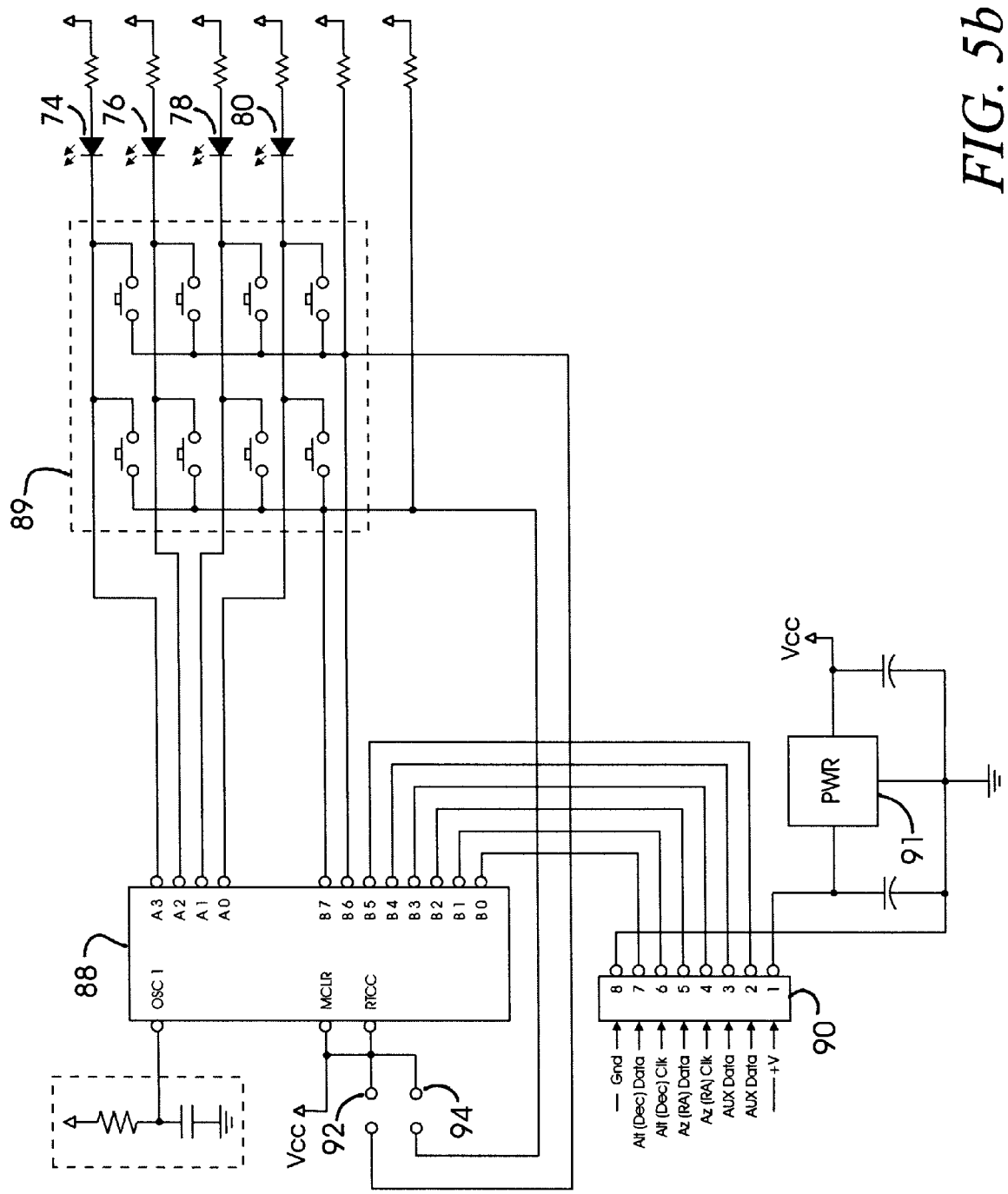

One particular embodiment of a hand-held control unit suitable for use in combination with a semi-intelligent motor assembly is depicted in FIGS. 5a and 5b. FIG. 5a is a front view of the exterior portion of a semi-intelligent drive motor motion control unit 70 illustrating the various function keys that might be used by a user of the telescope system in order to command a telescope to move through various evolutions. The motion control unit 70 comprises a hand-held, self-contained, computer control unit, enclosed within a functional housing. The motion control unit is operational as a dual-axis motor drive corrector which enables telescope axis motor motion, from the very small tracking corrections necessary for long exposure astrophotography at sidereal rates to the very fast slewing movements required for new object acquisition. The motion control unit supports motor movement commands for microslewing a telescope to, and for precision centering of a telescope onto, selected celestial objects. In addition, the motion control unit 70 is able to command certain special movement functions such as selecting various drive rates for the telescope motors, adjusting an optional electronic focuser, and the like.

Direction keys 71, labeled with directional arrows indicating movement directions (up, down, left and right) enable a telescope system to move, or microslew, in the specified direction at any one of a plurality of allowable, settable speeds. A speed key 72 is used to change a speed at which the telescope system is moved by depressing the key at the same time that one of the direction keys is being depressed. As was described previously, the number of allowable speeds which can be commanded to a semi-intelligent motor assembly according to the invention, is limited only by the number of speed bits comprising the speed and direction command. In the particular embodiment being described, the number of settable speeds that can be commanded to the semi-intelligent motor assembly is arbitrarily limited to four. At this juncture, it is important to mention that these settable speeds refer to telescope movement commanded by an observer that interrupts nominal telescope tracking motions, conducted at the well understood sidereal rate.

The four speeds selected for implementation in the illustrated embodiment range from the top speed of telescope motion, to a speed slightly in excess of the sidereal rate. The top speed corresponds to telescope displacement of from about 4° to about 9° per second. Top speed is particularly useful for slewing the telescope to the vicinity of new object which an observer desires to acquire. A second speed corresponds to about 0.75° per second of telescope motion and is useful for centering a selected object in a wide-field eyepiece. A third speed corresponds to about 32× the sidereal rate (about 8' of arc per second) and is useful for centering a selected object in a high-power eyepiece. The slowest settable speed is about 4× the sidereal rate (about 30' of arc per second and is typically used for precision centering and for guiding the telescope system during astrophotography.

Each of the individually selectable speeds are associated with a corresponding speed indicator LED which illuminates when that particular speed has been selected. For example, a first LED 74 illuminates when the selected speed is the top, a second LED 76 illuminates when the selected speed is the 0.75° per second rate, the third LED 78 illuminates when the selected speed is 32× the sidereal rate and the fourth LED 80 illuminates when the selected speed is 4× the sidereal rate. Thus, the currently selected speed is indicated by the speed indicator LED proximate the speed key 72 and depressing the speed key 72 increments the selected speed to the next speed, illuminating the appropriate speed indicator LED.

Focus control keys 82 and 84 are provided to enable the motion control unit 70 to control the operation of an optional electronic focuser which may be coupled to the focusing ring of a telescope view finder. Images appearing in the view finder may be focused by depressing the in 82 or out 84 focus keys, causing a "DIRECTION AND MOVE" command to be issued to an auxiliary focusing device over an auxiliary bus system, in a manner to be described in greater detail below.

A "mode" key 86 may be used to define certain special function operations, such as tracking rate changes, direction reversal, mount configuration identification, and the like. For each mode function capable of definition by the system, the LED bank indicates which of the chosen mode functions are operative at any given time. For example, when power is first applied to the motor control unit, all four LEDs are caused to blink rapidly, indicating the unit is ready for operation. Depressing any key on the housing causes the first LED 74 to become steady, while the remaining LEDs turn off.

In order to select mount configuration (Alt-Az or equatorial), the user depresses and holds the mode key 86 until both the first and second LEDs 74 and 76 burn steady, while the third and fourth LEDs 78 and 80 return to blinking. This action places the motor control unit in Alt-Az mode. To set the system into equatorial mode, the speed key 72 is depressed once for Southern Hemisphere operation, and twice for Northern Hemisphere operation. Depressing the speed key a third time returns the system to Alt-Az mode. Following the mount configuration mode choice, the user depresses the mode key 86 until only the first LED 74 is lit. The unit then exits the mode function and activates the direction keys. If equatorial mode was chosen, the drive motors are now set to track objects at the sidereal rate.

The tracking rate of a telescope system may also be changed, in 0.5% increments from the default sidereal rate, by accessing a tracking speed mode function through the mode key 86. To do so, a user depresses the mode key until the mode function shows active on the LED bank (LEDs 74 and 76 "on" steady, LEDs 78 and 80 indicating the tracking mode last chosen). Depressing the "in" key 82 causes the tracking rate to increase by 0.5% and causes the fourth LED 80 to burn steady. Depressing the "out" key 84 causes the tracking rate to decrease by 0.5%. The third LED 78 is caused to burn steady to so indicate. In order to exit the tracking rate change mode, the mode key 86 is again depressed, which returns the telescope to normal operation.

The internal construction of the semi-intelligent drive motor motion control unit 70 is illustrated in the schematic diagram of FIG. 5b. As can be seen, the operational focus of the motion control unit 70 is an EPROM/ROM based 8-bit microcontroller 88 exemplified by the PIC16C54, manufactured and sold by Microchip Technology, Inc. The function keys generally indicated at 89 described above in connection with FIG. 5a, provide inputs to the microcontroller 88 which, in response, develops control output signals which are directed to an 8-pin output header 90 having a pin configuration which corresponds to the 8-pin RJ11 connector (44 of FIG. 3b) of the electrical interface junction panel, to which the motion control unit 70 is intended to be connected. In response to the various direction, speed, focus and mode commands input to the microcontroller 88, the microcontroller develops and outputs control signals for the altitude motor (ALT CLK and ALT DATA), the azimuth motor (AZ CLK and AZ DATA), and a control signal pair for the auxiliary bus (AUX CLK and AUX DATA). Movement, speed, focus and mode commands are received by the microcontroller 88 and appropriate output control signals are developed thereby in accordance with a software or firmware program hosted by the microcontroller 88 and conventionally stored in an internal memory space such as a programmable ROM memory.

In addition to direction, speed, focus and mode commands, microcontroller 88 is adapted to differentiate between Northern and Southern hemisphere operations and between equatorial/Alt-Az tracking modes. A pair of jumpers are provided, with the first jumper 92 differentiating between Northern and Southern hemisphere operations by its presence or absence, respectively. Southern hemisphere operation is defined by the presence of a jumper in the first jumper position 92 which completes the electrical short and asserts an I/O active state on both the RTCC and B6 inputs. For Northern hemisphere operations, the jumper is absent from the first jumper position 92 putting the RTCC input in an I/O inactive state.

Likewise, equatorial and Alt-Az operational modes are differentiated by the presence or absence of a jumper in the second jumper position 94, respectively. Alt-Az mode is defined by shorting the jumper position and thereby asserting an I/O active state on the RTCC and RBC inputs. Equatorial mode is indicated by an I/O inactive state on RTCC while the B7 input remains active.

With regard to communication between microcontroller 88 of the control unit and the microcontroller 60 of the semi-intelligent motor assembly, commands are provided in serial fashion to the semi-intelligent motor assembly in accordance with a packet communication protocol, wherein each command packet comprises one or more bytes of information and with each information byte being sequentially clocked into the receiving microcontroller, bit-by-bit, by a serial clock signal. In accordance with practice of principles of the invention, each semi-intelligent motor assembly is directly coupled to the control unit's microcontroller 88 via a two-wire serial interface connection through the control unit's header 90 and, thence to appropriate I/O pins of the microcontroller 88. Thus, information being communicated between a control unit and a motor assembly need not be preceded with header information. However, since the auxiliary serial interface is able to host a multiplicity of auxiliary apparatus, information being communicated between a control unit's microcontroller 88 and a particular piece of auxiliary apparatus needs to be preceded by an address header in order to identify the information's intended recipient.

With regard to motor motion commands, these commands are issued directly to the motor assembly's microcontroller over the corresponding two-wire serial interface. Motor motion commands, more correctly termed step rate commands, are identified, in hexadecimal, as (00h) and comprise three bytes of information. The step rate is defined as the number of steps or "ticks" that occur approximately every 6 milliseconds. The format is a two's compliment number with the first number representing the whole steps or "ticks" and the next two bytes representing the fractional portion thereof. Each step rate command includes a sign (+/−) which determines the direction of motor motion.

A second step rate command, denoted (01h) in hexadecimal is formatted substantially identically with the (00h) command but is used for step rates greater than the 2× the sidereal rate. Additional information communicated between the control unit microcontroller and the motor assembly microcontroller include a "change error count" command (02h) which commands a one time change of the motor microcontroller error count register. A "set LED position" (03h) command sends out the I/O configuration byte which has been stored for that particular motor assembly in order to optimize its photodetector performance. A "find LED position" (04h) command is issued to the motor assembly when it is desired that the motor assembly finds the best LED current in order to optimize photo detector performance. A "get LED position" (09h) command instructs the motor assembly to write out the I/O configuration byte that corresponds to optimized photo detector performance.

Additional commands, such as "turn on motor in positive direction" (06h) and "turn on motor in negative direction" (07h) are also provided by the control unit to the motor assembly's microcontroller. A "status" (08h) command is read from the motor assembly's microcontroller the "status" command is typically 3 bytes in length and further includes an additional flag bit. The first two bytes of information comprise the determined change in motor position since the last status read. The next byte comprises the PWM pulse count which is used to determine whether or not the motor is in a stall condition. The final bit, the flag bit, an illegal encoder flag which indicates that an encoder "tick" was missed during the current motor position change. This bit is typically reset after a data read, as is the determined motor position information.

Those familiar with the internal construction and operational programming of a PIC16C5X series microcontroller will be able to routinely develop additional applications and command sets suitable for, for example, controlling LED operation, developing a digital clock, or controlling a keypad. All that is required in practice of principles of the invention, is that the control unit microcontroller be able to communicate with one or more motor assemblies so as to command, at least, motor speed and direction changes which the motor assembly executes without further intervention on the part of the control unit. This distribution of intelligence allows both the motor assembly and the control unit to be implemented using relatively simple components, with each respective apparatus being responsible for a particular set of functions; the control unit translating keypad input into motor motion commands, the motor assembly receiving the motor motion commands and causing the required amount of telescope motion about its axis. Commands and status information are communicated between the control unit and the motor assembly via a two-wire serial interface in accordance with a packet communication protocol. The control unit is able to determine that its commands have been appropriately executed by evaluating returned status information from the motor assembly. Appropriate telescope motion in response to a motor movement command is ensured by evaluating feedback signals developed by an optical encoder system mechanically coupled to the motor and electronically evaluated by the motor assembly's microcontroller unit.

Thus, in accordance with the invention, the hand-held control unit and motor assembly, in combination, suitably provide means for distributing motor control intelligence, with the intelligence partitioned into first and second portions, the first portion responsive to user input and for translating that input into suitable command signals, the second portion responsive to the command signals and translating the command signals into signals suitable for use by a motor driver circuit in effecting motor motion. The two portions of the system's distributed intelligence are coupled together over a two-wire serial interface allowing bi-directional communication of data and command signals between the two portions over a thin, flexible cable.

Figure 6A:
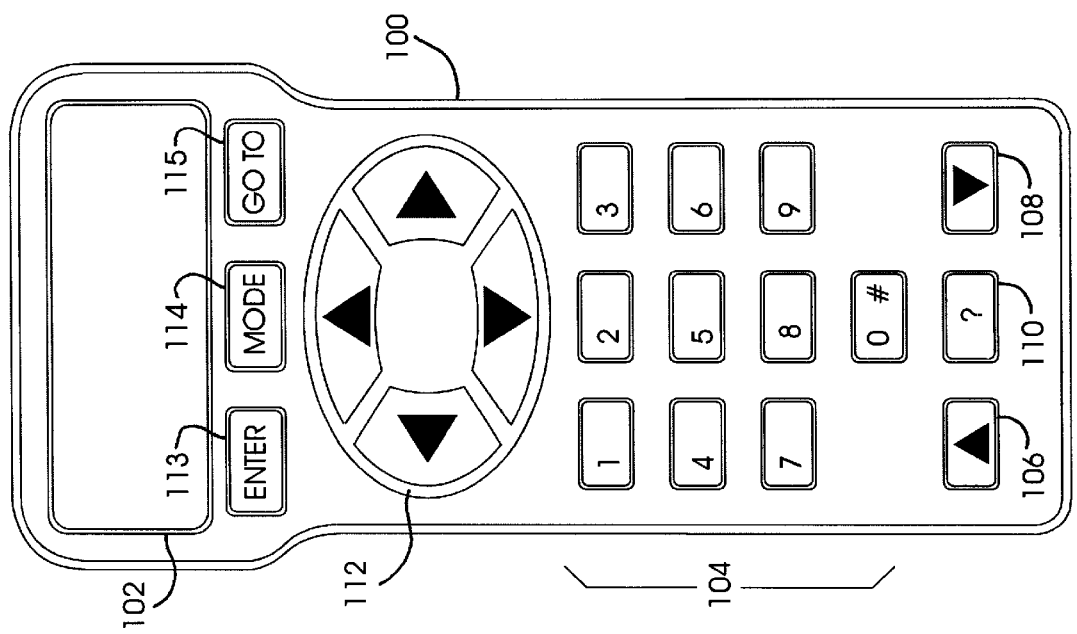
FIG. 6a is a semi-schematic front view of an intelligent dual-axis drive motor motion control system according to practice of principles of the present invention.
Figure 6B:
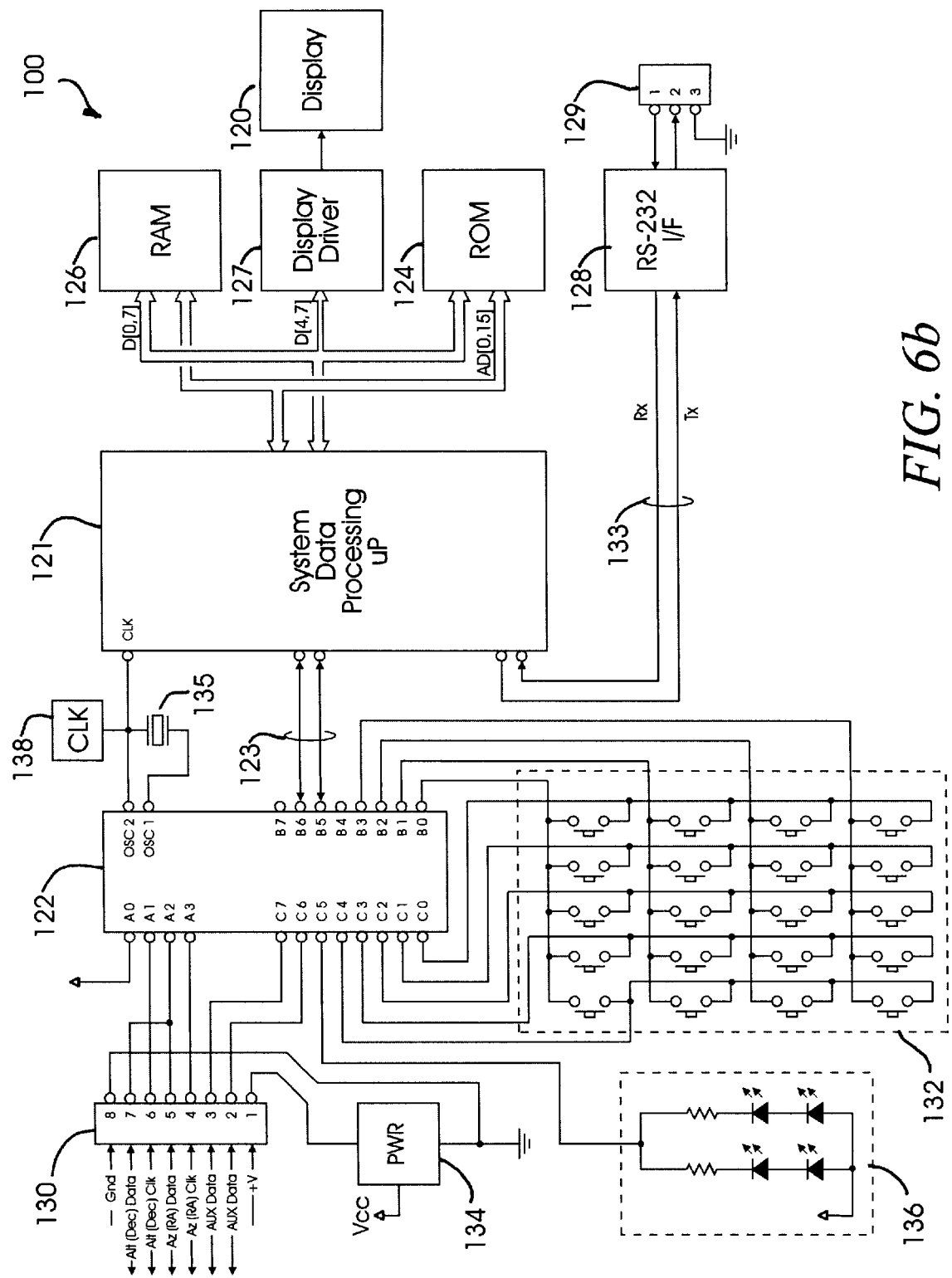

An additional embodiment of a hand-held control unit suitable for intelligent control of a telescope system according to the invention, is illustrated in FIGS. 6a and 6b. FIG. 6a depicts the exterior of an intelligent telescope system controller as it would appear to a system user, while FIG. 6b illustrates, in semi-schematic block diagram form, configuration of the electronic system components which provide functionality to the controller 100.

FIG. 6a is a front view of the exterior portion of an intelligent telescope system controller 100 illustrating the various function keys that are used by a user of the telescope system in order to command a telescope to move through various evolutions. The intelligent controller 100 comprises a hand-held package which functions as a full-spectrum control unit capable of intelligently defining and commanding motor movements required for astronomical observations, as well as for implementing various pre and post processing features in a manner similar to a microcomputer.

The intelligent controller 100 suitably comprises an LCD display screen 102, capable of displaying text, numeric and graphic output data that might be consulted by a user in operating the telescope system. All prompts, user queries, confirmation messages, and the like, are displayed on the LCD screen 102. Telescope motion direction keys 112, labeled with directional arrows, indicating up, down, right and left, provide the necessary inputs for enabling the telescope system to move, or microslew, in the specified direction, at any one of a number of allowable, settable speeds. As was described previously, the number of allowable speeds which can be commanded to the semi-intelligent motor assembly according to the invention, is limited only by the number of speed bits comprising the speed and direction command. In the particular embodiment being described, the number of allowable speeds that can be commanded to the semi-intelligent motor assembly is 8, with one of the 8 allowable speeds being reserved for the motor stop command. Motor speed changes are effected by entering numerical values on a numeric keypad 104. To change or define a particular motor speed, a user presses and releases the desired numeric key corresponding to the desired speed range (1 being the slowest, 9 being the fastest). Once the desired speed is selected, the desired motion direction key 112 is depressed and the system commands the corresponding semi-intelligent motor assembly to move the telescope system at the desired speed, in the desired direction.

Scroll keys 106 and 108 are provided in order that a user may scroll through a data base listing or through available menu options that might be shown on the LCD display screen 102. A "?" key 110, disposed between the scroll keys 106 and 108, accesses an internal "help" file and, when depressed, causes the LCD screen 102 to display a brief description of the selected menu item on the first line of the display. An enter key 113 selects a file menu or option, or is used to define the completion of an entry made in response to a system prompt. A mode key 114 allows a user to exit a current menu to return to a previous menu and a go-to key 115 commands the telescope system to slew the telescope to an object chosen from an internal celestial object data base listing, for example.

The internal construction of the intelligent telescope system controller 100 is illustrated in the schematic diagram of FIG. 6b. As can be seen from the figure, the intelligent controller, indicated generally at 100, suitably comprises a dual processor system, with the dual processing functions implemented by a first, general purpose microprocessor 121 exemplified by the 68HC11, a member of 68 HCxx family of microprocessors manufactured and sold by Motorola, and a second, purpose configured microprocessor or microcontroller 122, exemplified by the PIC16C57 microcontroller manufactured and sold by Microchip Technology, Inc.

The general purpose microprocessor 121 is coupled to a 16-bit address and data bus (AD[0,15]) and an 8- data bus (D[0,7]), which allow the microprocessor 121 to communicate with a programmable read-only memory (ROM) memory circuit 124 and a random access memory (RAM) 126. Further, the four most significant bits of the data bus (D[4,7]) are coupled to the system's LCD display driver circuit 127 to provide an interface between the microprocessor 121 and the system's LCD display 120. As will be described in greater detail below, the microprocessor 121 is responsible for implementing the top-level firmware architecture of the system according to the invention and for executing loadable application software routines pertinent to the exemplary intelligent telescope system.

Programmable read-only-memory circuit 124 is preferably implemented as a FLASH programmable ROM and is provided in order to host the instruction set for downloaded applications and software routines, data tables such as a stellar object position data base, the Messier object catalog list, an earth-based latitude/longitude correspondence table, and the like. Although described as an FPROM, the ROM memory may be implemented as an EEPROM, or any other type of programmable non-volatile memory element. Indeed, the ROM 124 might be implemented as an external mass storage unit, such as a hard disk drive, a programmable CD-ROM, and the like. All that is required, is that the memory 124 be able to be written to, in order that its hosted data bases and tables may be updated, and be non-volatile, in order that its hosted data bases and tables be available to the system upon boot-up or power-on-reset.

Microprocessor 121 is further coupled via a 2-bit serial-type control bus 123 to the microcontroller 122 which, in turn, is coupled via a multiplicity of interface signal lines to the various function keys (indicated generally at 132) which comprise the operator/system interface for this system. In this respect, the microcontroller 122 functions as the system I/O and interface controller which translates user input taken from the keypad, and provides command and control signals, derived from the user input, to the system microprocessor over the serial interface 123. The serial interface bus 123 is further comprised of two signal lines, CLK and DATA, which function much the same as the 2-wire serial interfaces between a motor assembly and the particular embodiment of a control unit described in connection with FIG. 5b. The interface bus 123 is bi-directional and command and data signals are communicated in accordance with a packet transmission protocol.

The system microprocessor 121 is further coupled to RS-232 interface port circuitry 128 via an additional 2-wire (supporting conventional Tx and Rx signal lines) serial bi-directional interface bus 133. The RS-232 port circuitry 128 is in turn coupled to an RS-232 interface connector 129, through which bi-directional communication between the microprocessor 121 and external information sources such as a personal computer (PC), a World Wide Web interface link, and the like, may be effected. Indeed, the RS-232 port 128 may be configured to communicate with a similar RS-232 port comprising another, separate intelligent controller system operating in connection with another, separate telescope system. It will be understood that, when operating under appropriate I/O control application firmware, the microprocessor 121 in combination with the RS-232 port 128 provides means for quickly and easily interfacing the system to an external source of programming code, data or other information that a user might desire to incorporate into the operating instructions or data tables comprising the intelligent controller of the present invention.

Likewise, the microcontroller 122 is coupled to a bundled serial interface connector 130, suitably comprising an 8-pin RJ11-type interface suitable for connection to the 8-pin receptacle (44 of FIGS. 3a and 3b) of the electrical interface panel (30 of FIGS. 3a and 3b). The serial interface connector is configured to support communication between the microcontroller 122 and two telescope axis drive motor assemblies along with a plurality of auxiliary devices, over respective 2-wire serial interface busses. So configured, the PIC16C57 microcontroller 122 will be understood as interfacing between the user I/O interface keys 132 and the 68HC11 microprocessor 121, to generate command and control signals suitable for use by a semi-intelligent motor assembly and/or an auxiliary device, such as an electronic focusing system, and provide such command and control signals to the serial electrical interface panel (30 of FIG. 3a and 3b) for routing to their appropriate destination. A crystal oscillator circuit 135 is further coupled between the microcontroller's clock inputs (OSC1 and OSC2) and provides an 8 Mhz operational clock signal to the microcontroller 122.

Power is also received, from an external power supply, through the serial interface connector 130. The power and ground pins are coupled to a power supply circuit 134. The supply circuit 134 is preferably implemented as a voltage regulator and functions to condition a 12 Volt (for example) supply input to the reduced voltage levels required by modern integrated circuits. A pertinent consideration given to the power supply circuit 134 is its need to provide suitable supply voltages and currents for a plurality of LEDs which populate the system 100. In particular, the LCD display 120 is backlit by an arrangement of LEDs which are configured in a circuit 136 and disposed about the display screen in a novel fashion to provide uniform illumination of the entire surface of the display screen. Operation of the LED circuit 136 is controlled by the microcontroller 122, and its configuration will be described in detail below.

In accordance with the present invention, the 68HC11 microprocessor 121 performs the high level application software execution tasks and the associated data handling and numerical processing, in order to define the appropriate motion commands to be provided to the PIC16C57 microcontroller 122. The microcontroller 122 receives motion command inputs from either the microprocessor 121 or the user interface keys over interface bus 123 and suitably processes the received motion commands into command and control signals suitable for use by a motion control processor.

To complete the system, and to give the microprocessor 121 some means of performing time calculations appropriate to celestial motion, a real time clock 138 is provided and is coupled to a clock input of the microprocessor 121, as well as being coupled to a clock input of the microcontroller 122. The real time clock 138 is preferably implemented as a precision timing reference clock signal generator, such as a UTC clock, that is used by the microprocessor 121 to calculate sidereal time intervals and preferably resides as an integral component of the control unit 100. Alternatively, the clock 138 might be implemented as a separate, off-board integrated circuit comprising a conventional UTC clock which communicates with the system over the RS-232 interface, or an on-board UTC clock and follow-on circuitry for converting UTC time intervals to sidereal time intervals prior to providing a timing reference signal to the microprocessor 121.

Thus, it should be understood that the intelligent telescope system controller 100 suitably comprises a means for adding full intelligence to a telescope system which includes semi-intelligent motor assemblies in accordance with the present invention. The intelligent telescope system controller performs this function by bifurcating the system's processing and control functions into a first, sub-system comprising a microprocessor operative for system data processing, and a second, microcontroller system for implementing I/O control. System intelligence is maintained up-to-date, by allowing "new object" loadability through an RS-232 port. System software, updated celestial object catalog tables, and the like, may be loaded into the system through the RS-232 port from a PC, an attached disk or diskette drive, a web site, a separate intelligent telescope system controller in accordance with the invention, and the like.

In particular, a user may "clone" his system's application programs and his system's database contents into another user's system using the RS-232 port to effect bidirectional communication. Alternatively, the user may receive program and data information from a second intelligent telescope system controller, thus "cloning" that controller into his own, over the RS-232 interface. The "clone" function is implemented by accessing the various user interface keys provided on the exterior of the controller 100. For example, the user might depress the mode key 114 until a system I/O menu appears in the controller's LCD display. The user might then scroll through the menu using the scroll keys 106 and 108 until a "clone" menu option appears in the screen. If suitable connections are made between two intelligent system controllers according to the invention, and if the appropriate input and output states are set for each controller (the controller being cloned outputs data), the user might depress the enter key 113, initiating the process.

Several other system utilities are supported by the microprocessor 121 of the intelligent telescope system controller according to the invention. For example, the system may be placed in a state of suspension by invoking one of two, reduced functionality, modes termed "sleep mode" and "park mode". Since, as was described above, the system and timing reference is preferably a crystal controlled clock 130 coupled to the microprocessor 121, an external time-of-day input is required in order that the system can correctly calculate the system's local hour angle and, thus, the celestial sphere's rotational state with respect to a specific observer. When the system is placed in "park mode", all system orientation parameters (to be described subsequently) are saved in the buffer/scratch pad RAM 126, from whence they may be recalled when a user desires to perform additional observations. Once the system is oriented and has been placed in "park mode" all that is required is that the user input a time-of-day datum for the telescope system to precisely know (or, more correctly, remember) its orientation with respect to the sky.

In "sleep mode" the system again remembers its orientation parameters, but maintains the clock 138 in an operative condition while reducing power to the remaining system components to maintenance levels. Thus, in "sleep mode" the system is ready to "wake up" at any time the user gives it an operation command.

Beyond support of system utilities, the intelligent telescope system controller is also able to support a multiplicity of auxiliary devices that might be coupled to the telescope system in order to enhance its capabilities. Pertinent such devices include an automatic focusing unit, a clock and date module, a speech recognition module and an associated audio output module, an automatic alignment tool(tube leveler and/or axis planarizer), a global positioning system (G.P.S.) module, a photometer, an autoguider, a reticle illuminator, a cartridge reader station (for courseware, new revisions, new languages, object libraries, data storage) and the like. Each auxiliary device is coupled to the system, in daisy-chain fashion, over the AUX DATA and AUX CLK signal lines comprising a serial auxiliary bus system. As was the case for the Alt (Dec) and Az (RA) serial busses coupled between the controller and the motor assemblies, the auxiliary bus is a 2-wire serial communication interface and further includes a supply voltage line, supplying 6–18 and preferably 12 Volts of power, and a ground potential line.

The 2-wire interface comprises a bi-directional data line which supports data communication using a packet transmission protocol, and a clock line which supports a clock signal typically sourced by the bus master, in this case, the system controller. Because the auxiliary devices are daisy-chain configured, each device is provided with a unique bus address so that commands can be efficiently processed by the particular device being accessed. In accordance with the present invention, bus addresses are expressed as a binary numerical value defining an address byte. Thus, the system is able to communicate with up to 256 separate addresses and, therefore, 256 separate devices. However, as will be explained below, one address, the "byte zero" address, is reserved as a broadcast address, indicating that the following command or commands are to be executed by all devices coupled to the bus.

All communication transactions over the auxiliary interface bus are performed in accord with a packet transmission protocol. All bus activity begins with a bus master (typically the system controller) initiating a communication packet to a selected target device. Once the master-to-target communication is completed, the target device returns a message or status communication packet back to the bus master. As illustrated in the simplified interface protocol packet content diagram of FIG. 12, all packets begin with "count byte" which defines the number of bytes comprising that particular initiating or response packet. In the case of an initiating packet, the second byte comprises the "address byte" for the particular target device which will execute the command, and is followed by a "command byte" which defines the operation to be carried out. "Intermediate bytes" unique to each device, follow the "command byte" in the case of an initiating packet, or the "count byte" in the case of a response packet. A "last byte" is also unique to each device and is the final byte of an initiating packet transmitted by the master. Optionally, a target device may be configured to transmit a "last byte" as the final byte of a response packet.

The clock signal is driven by the bus master for all information transfers, regardless of the direction of data flow. In addition, the bus master may temporarily relinquish control of the bus and designate a particular device to temporarily assume the bus master role in third-party data transfer operations, such as between a CCD imager and a disk drive. All auxiliary devices are "I/O hot" in that all devices are constantly "snooping" the bus and can evaluate all packets transmitted thereon. Once a device determines that a packet header contains its address, the rest of the packet is clocked into its I/O registers and the command is then executed.

Certain broadcast commands are common to all auxiliary devices and are identified by a "broadcast address", indicating that all devices coupled to the bus are to execute the following command. Exemplary broadcast commands include a "bus reset" command which is used to perform a soft reset of the bus and the "sleep" command which places each device in its own particular low-power mode. An "inquiry" command is not specifically a broadcast command, but is nevertheless directed to all devices on the bus; albeit sequentially. The "inquiry" command is used to determine the presence of a device on the bus. The initiating packets cycle through the bus addresses, with devices populating the bus returning a status byte identifying the device revision number or module type, as their addresses are received.

The full spectrum of auxiliary device command sets can be easily implemented in the intelligent system controller (100 of FIGS. 6a and 6b) because of the capability range of its microprocessor (121 of FIG. 6b). It will be understood, that the full spectrum command set may be incorporated in the microprocessor by a reasonably proficient programmer making the intelligent system controller 100 capable of supporting the full spectrum of auxiliary devices. A reduced set of auxiliary device command sets are implemented in the semi-intelligent system controller (70 of FIGS. 5a and 5b) because of the relatively limited capabilities of its microcontroller 88, with respect to the capabilities of the fully intelligent system. Thus, only certain auxiliary devices are supported, such as an electronic focusing unit, in the semi-intelligent configuration, while the capacity for upgrading the system to a fully intelligent configuration remains unimpaired. Indeed, the serial auxiliary interface bus provides a particular enabling feature for system upgrade capability by virtue of its simplicity and the inherent expandability of the 2-wire serial bus concept. Adding capability to the telescope system of the invention, is as uncomplicated as merely coupling additional devices to the bus. The bus, then, provides the framework within which intelligence and capability are added, subtracted or modified on a piece-by-piece basis.

Each component coupled to the system comprises its own operational intelligence and requires only a serial command interface with a controlling entity to perform its designated function. Since each component comprises sufficient intelligence (processing power) to execute its tasks without higher level supervision, the controlling entity is free to execute application programs, perform complex arithmetic calculations, maintain database entries, and the like.

Primary control of an automated telescope system with distributed intelligence, in accordance with the present invention, is provided by a fully intelligent telescope system controller 100. Substantially all functions of an automated telescope system can be implemented through the keypad portion of the controller 100 by depressing the various alpha, numeric and function keys provided thereon. Once the automated telescope system has been appropriately aligned, as will be described in greater detail below, an object menu library, stored in a dedicated memory space provided in the controller, is used to automatically slew the telescope system to any particular celestial (or terrestrial) object an observer desires to view or photograph. However, prior to beginning an observation and, indeed, during initial setup of the system, a user must first initialize the system by entering certain information in accordance with an initialization, or setup, procedure which can be best understood with reference to the initialization procedure flow chart of FIG. 8.

After each of the individual components comprising the telescope system are connected together through the electronic interface junction panel (30 of FIG. 2), the intelligent system controller 100 is plugged into the control unit port (44 of FIGS. 3*a* and 3*b*) and power is provided to the system. Following "power-on-reset" a warning message is displayed on the LCD screen 102 of the system controller 100, warning the user not to look directly at the sun through the telescope. The warning remains on the LCD screen 102 for a period of a few seconds following which the system controller prompts the user to enter the current date, by entering the appropriate figures in a formatted date field. An exemplary date field might appear as "01-Jan-1999". Numeric values, such as the date and year are entered by pressing the corresponding numeric keys of the numeric keypad 104 when prompted to do so by the system. The current month is entered by scrolling through a list of months using the up 106 and down 108 arrow keys provided for that purpose. In particular, the date cursor automatically jumps to the next space once a particular numeric value is entered. If a mistake is made during entry, the right or left directional keys may be depressed in order to move the cursor backward or forward until it is positioned over the incorrect entry. The correct entry may then be made by depressing the appropriate numeric key on the numeric keypad 104.

The numeric keys are used to enter the current day. Then, the up 106 and down 108 scroll keys are used to cycle through the list of months. When the current month is displayed the right arrow key causes the cursor to move to the year field into which the current year is entered using the numeric keys 104. After all of the date information has been correctly entered, a user depresses the enter key 113 in order to inform the system that the current date has been entered and the date setting procedure is now concluded.

The system then prompts the user to enter the current time. It should be noted that the system is operative in a 24-hour mode and, therefore, time should be entered using a 24-hour clock (i.e., 9:00 pm is entered as 21:00). As was the case with the date entry, a user depresses the enter key 113 in order to inform the system that the time entry procedure has been concluded. It is worth mentioning, at this point, that a user should enter a time just slightly ahead of the current time prior to depressing the enter key. The enter key is depressed at the exact moment the current time matches the time the user entered. This procedure is very useful in enhancing the precision of the positioning calculations undertaken by the system, by giving the system a more precise indication of the correct time. Needless to say, the more precise the time indication provided to the system, the better the system will be able to locate objects on the basis of their published right ascensions and the better the system will be able to accurately position the telescope to view them.

At this point, the positioning keys 112 of the system controller 100 are activated such that they may be used to move the telescope. A user is able to either immediately proceed to using the telescope without further initialization data entry, or continue with data entry in order to enable additional features of the inventive system. If a user chooses to continue with initialization, a next procedure displays the status of a daylight savings time feature. Daylight savings time is in effect from the first Sunday in April through the last Sunday in October in most areas of the United States and Canada. Users are cautioned to investigate as to whether their geographic local time conforms to daylight savings time or not. The display status is in a "negative default" condition indicating that the daylight savings time feature is not enabled. If a user is currently in daylight savings time, the enter 113 key is depressed once which causes the display indication to change from NO to YES. When the desired setting is displayed on the screen, the mode 114 key is depressed indicating that the daylight savings time procedure is concluded.

A next sequence of data entry options enables a particularly novel orientation feature of the present invention, wherein an observer's latitude and longitude are approximated by the latitude and longitude of the closest city or other geographical landmark which a user may designate as reasonably approximating his observation location. For example, the next procedural step causes the LCD display 102 to request entry of the nation, state or province, of the user's primary observation site. The UP 106 and DOWN 108 scroll keys are used to scroll through a list of various countries, states and provinces contained in the system's database until the observer's nation, state or province appears on the screen. Following selection of the observer's nation, state or province, the observer is requested to select the closest city or major geographical feature to their primary observation location by using the UP and DOWN scroll keys to cycle through an alphabetical list of cities and geographical features. When the desired city or feature is displayed on the LCD screen, the user presses the enter key 113 to inform the system that the virtual location procedure has been concluded. The geographical coordinates (latitude and longitude) of the selected site are then entered into system memory as a first approximation observation location indicia which is used in combination with the current time to orient and align the telescope system for fully automated use.

Figure 9:
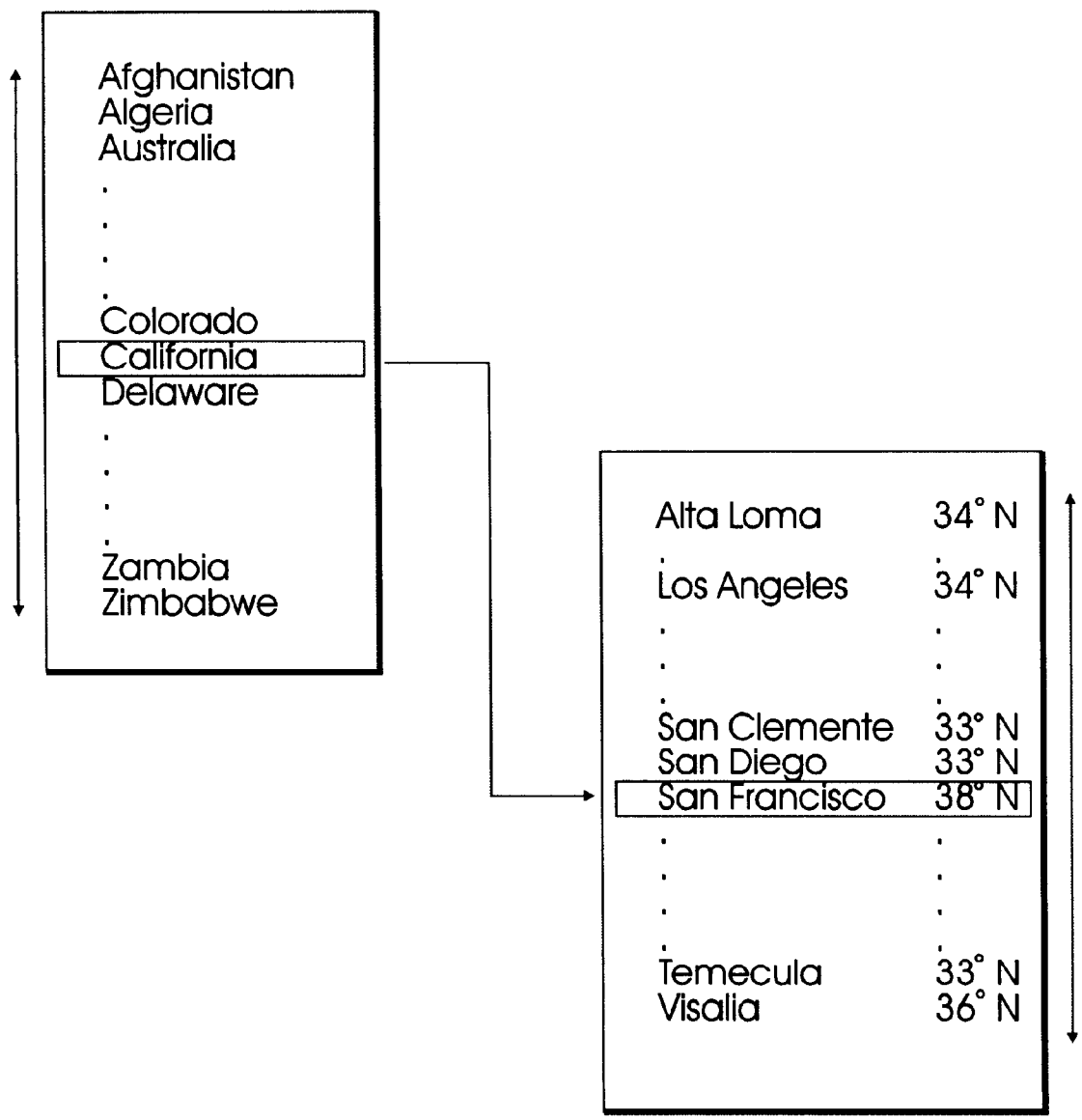
FIG. 9 is a database table illustrating an exemplary location entry.

This virtual location procedure is enabled by a database table comprising a multiplicity of alphabetically listed geographic locations with each associated to their known latitude and longitude coordinates, as depicted in FIG. 9. FIG. 9 illustrates a partial database listing of an exemplary top-level location table and a sub-level database listing for locations contained within the indicated California entry. The location database listing is typically stored in the system's ROM memory 124, but might alternatively be stored in an external disk drive, on floppy diskette, or some other such mass storage device so long as the location database listing is stored in some form of non-volatile memory such that it may be accessed at need upon system power-up.

The need for such a virtual location procedure is evident when one considers that the location of a particular celestial object in the night sky, at any given time, is solely a function of the observer's latitude and the observer's local hour angle displacement from the celestial meridian, in turn a function of the observer's longitude and the observer's local time-of-day. Thus, once an observer's latitude and longitude are known, and the time-of-day (expressed in universal time coordinates) is known, the observer has all of the information necessary to compute the relative bearing in either altitude and azimuth or declination and right ascension of any celestial object whose absolute coordinates are known. When an observer enters a reasonable approximation of his latitude and longitude, and enters his local time, the system is able to reasonably approximate the orientation of the night sky with respect to that observer. As will be described in greater detail below, further corrections may be made to this "first approximation" orientation procedure in order to more precisely and accurately define the night sky with respect to the telescope's orientation.

Following the virtual location procedure, the system then prompts a user to enter the configuration and alignment mode to be used for the telescope system to which the system controller 100 is coupled. The system has two configuration and alignment options; Alt-Az and polar (equatorial). The choice between these two configuration and alignment modes is made by scrolling through the choices using the UP 106 and DOWN 108 arrow keys until the appropriate configuration and alignment mode appears on the screen. When the appropriate mode appears, the user depresses the mode 114 key thereby informing the system of the configuration and alignment method most appropriate for the telescope system. Once system configuration is determined, the controller commences a motor test, slewing the telescope a short distance horizontally and vertically (RA and Dec). After the motor test is completed, the system initialization is complete and the telescope system is ready to be aligned for observations.

System initialization is performed the first time that power is applied to the system controller 100 or any time the system is affirmatively RESET. During subsequent observation sessions, when power is applied to the system controller 100, the controller internally initializes and will only prompt a user to enter a randomly selected number used in connection with the sun warning and, subsequently to enter the time and date. From this point, the system proceeds directly to telescope alignment and, in addition, if the polar (equatorial) configuration and alignment model was specified during the initialization procedure, the system controller 100 automatically activates the right ascension (RA and Dec) motor subassemblies.

Since the system controller is operable to define telescope alignment with respect to both Alt-Az and polar (equatorial) configuration and alignment models, it would be appropriate to discuss the different alignment procedures associated with each of the models seriatim, with the Alt-Az alignment models being described first. In accordance with practice of principles of the invention, the system enables the user to choose among four different alignment procedures, three of which are concerned with aligning the telescope to the celestial sphere and one of which is used in connection with terrestrial alignment.

In a manner well understood by those having skill in the art, a telescope configured to operate in an Alt-Az mode is unable to "stop the sky" in hardware by maneuvering in equatorial coordinates. Accordingly, Alt-Az telescope configurations must "stop the sky" in software when tracking a celestial object. In contrast to a polar or equatorial mounting, which may be driven in one axis only, at a constant rate, both axes of an Alt-Az telescope mount must be driven at rates that vary over a wide dynamic range. Specifically, the drive rate equations for the altitude and azimuth motors, respectively, of an Alt-Az telescope systems are as follows:

$$\frac{dZ}{dh} = 15\sin A\cos\varphi \qquad \text{EQUATION 1}$$

$$\frac{dA}{dh} = -15(\sin\varphi + \cot Z\cos A\cos\varphi) \qquad \text{EQUATION 2}$$

Where Z is the calculated zenith distance of an observer, h is the observer's local hour angle (or LHA), A is azimuth (measured Westward from the South) and $\varphi$ is the observer's latitude. The rate of change of an object's zenith distance Z with hour angle h and the rate of change of an object's azimuth A with respect to hour angle h is defined in units of (sidereal second)$^{-1}$. Thus, in order for the telescope system to be able to adequately acquire and track a given celestial object, it is necessary that the telescope system understand its orientation with respect to the sky such that such that an observer's latitude and local hour angle ($\varphi$, h) can be calculated.

Over the centuries, a great deal of thought and consideration has been given to various methods for determining latitude and longitude from an evaluation of the positions of celestial objects with respect to the celestial coordinate system. Specifically, the field of celestial navigation is directly concerned with mathematical methods for determining an observer's latitude and longitude from measurements taken of the positions of the sun, moon, planets and various known stars. Although position determination methodologies have evolved over the centuries, they may all be conceptually viewed as defining various mathematical means for observing and measuring the positions of celestial references in an earth-based coordinate system (rectangular coordinates or altitude-azimuth coordinates) and comparing the measurements so obtained with the positions of such celestial objects expressed in celestial coordinates (right ascension and declination) as are tabulated in an ephemeris.

The solution to any given problem in celestial trigonometry therefore depends on being able to convert measurements obtained in one coordinate system (Alt-Az, for example) in the other coordinate system (the celestial coordinate system). Coordinate system conversions are well understood by those having skill in the art and, indeed, have also undergone a conceptual evolution, culminating in modern day, computer assisted, matrix transformation and rotation mathematics. Nevertheless, regardless of the coordinate systems used to express an observation and the coordinate system used to define a universal reference, observations made in one coordinate system may be rotated into the reference coordinate system using simple mathematical principles, so long as two points in one coordinate system correspond to the same two points in the other coordinate system such that the transformation boundaries with respect to displacement and rotation are defined. Thus, in accordance with generally accepted mathematical principles, two reference points expressed in an Alt-Az coordinate system, for example, are a necessary and sufficient condition for the Alt-Az coordinate system to be rotated into a celestial coordinate system, so long as those same two measurement points have a corresponding location metric in the celestial coordinate system.

Figure 10A:
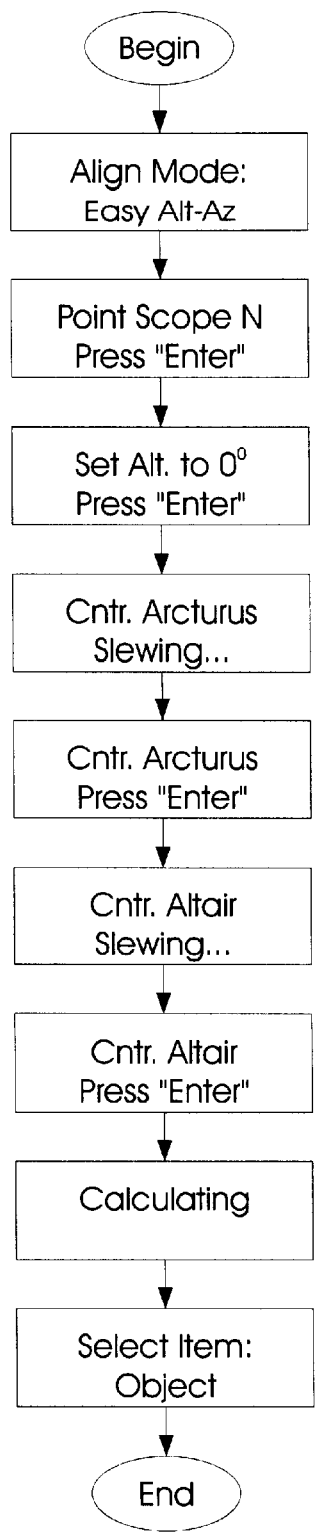
FIG. 10a is a conceptual flow diagram of a first, "easy" alt-az alignment and orientation procedure in accord with the invention.

Proceeding now to the alignment methodologies in accordance with practice of the invention, a first, "easy" alignment procedure will be described in connection with the procedural flow chart of FIG. 10a. After internal initialization and prior to beginning an observation session, the LCD display 102 of the intelligent telescope system controller 100 displays a prompt screen requesting the user to select one of four alignment procedures, which a user may select by scrolling through the various choices using the UP 106 and DOWN 108 scroll keys. A first alignment procedure, denoted "easy" requires no knowledge of the night sky because the system controller is able to locate its own alignment stars based on the date and time entries provided by the user during initialization.

Specifically, when the "easy" alignment procedure is selected, the system next prompts the user to move the telescope (using the motion keys 112) until the telescope is pointed North. After the telescope tube is pointed North, a user depresses the enter key 113 to inform the system that the telescope tube is in its appropriate position. Next, the system prompts the user to level the telescope tube by adjusting the telescope's altitude position until the altitude (or declination) setting circle is set to 0°. Pointing the telescope North and leveling the telescope tube functions to zero-in the position encoders of the altitude and azimuth motor assemblies. Any subsequent motion of the telescope away from its 0,0 position allows the telescope system to directly calculate its altitude and azimuth displacements from the 0,0 reference point. Using the time and date entries presented by the user, the telescope system consults a database of well known celestial objects and selects a particular bright object which is currently above the horizon. The entered time and date information allows the system to calculate whether that particular bright object has rotated sufficiently in right ascension to bring it above the observer's horizon, while the virtual latitude and longitude entry provided by an observer's entering their closest city or geographic feature, provides the system with sufficient information regarding an observer's latitude so that it may calculate an approximate declination value for that bright object.

Once an object (star) is identified in the database, the system automatically slews the telescope to the vicinity of that star by commanding the appropriate motion from the altitude and azimuth motors. Once the telescope has slewed to the vicinity of the desired star, the observer is prompted to center the star in the field of view of the telescope eyepiece, using all four direction keys (112 of FIG. 6*a*) as required to center the star. When the star is centered in the field of view of the eyepiece, the observer presses the enter key 113 and the system then searches the data base for a second bright object or star which is displaced at least 30° from the previous star in order to increase the accuracy of alignment procedure. Once the second star is identified from the data base, the system automatically slews the telescope to the vicinity of that star and once again prompts the user to center that star in the field of view of the eyepiece using the direction keys 112 of the system controller 100. When the second star is centered, the system calculates the position and orientation of the telescope with respect to the night sky (the celestial sphere).

Figures 10B, 11B:
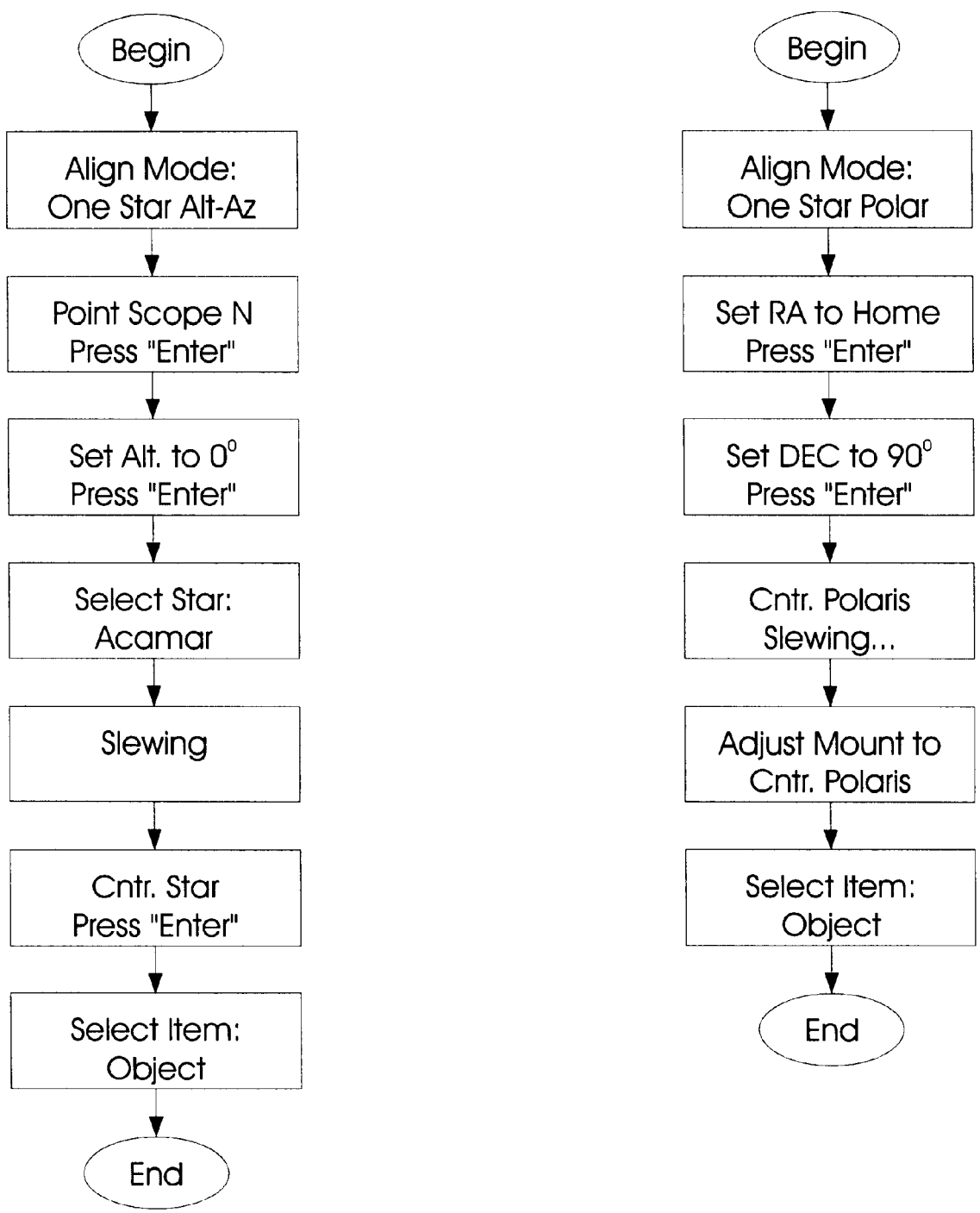
FIG. 10b is a conceptual flow diagram of a second, single star, alt-az alignment and orientation procedure in accord with the invention.
FIG. 11b is a conceptual flow diagram of a second, single star, polar alignment and orientation procedure in accord with the invention.

A further, truncated, alignment procedure is depicted in the alignment flow chart of FIG. 10*b*, in which an Alt-Az configured telescope is oriented to the night sky using only a single star alignment procedure. As with the previous case, a user is prompted to zero-in the motor position encoders by pointing the telescope to the North and leveling the telescope such that the altitude setting is at 0°. The user then selects a particular star from an alphabetized stellar object database list and presses the enter key 113, causing the telescope to automatically slew to the vicinity of that star. The user centers the star in the field of view of the eyepiece by depressing the position keys 112 as required. Once the chosen star is centered in the field of view of the eyepiece the user again presses the enter key 113 the telescope is aligned for a night of viewing.

Although the telescope might technically be considered "aligned" after the user follows the above-described one star alignment procedure, the accuracy of the one star telescope alignment procedure should only be considered sufficient for general astronomical observations. Because of certain pointing errors that occur as the result of well known astronomical perturbations, as will be described further below, additional observations and alignment steps should be incorporated into the procedure to refine the accuracy of the initialization procedure.

Figure 10C:
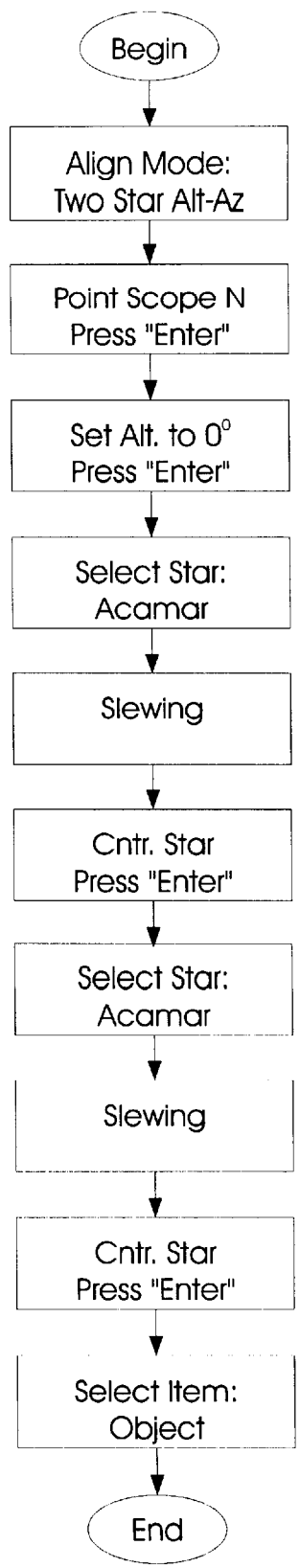
FIG. 10c is a conceptual flow diagram of a third, two-star, alt-az alignment and orientation procedure in accord with the invention.

Turning now to FIG. 10*c*, a user definable two star alignment procedure will now be described in connection with the illustrated procedural flow chart. As with the previous two alignment procedures, the telescope undergoes an internal initialization prior to beginning the observation session following which the LCD display 102 of the intelligent telescope system controller 100 displays a prompt screen requesting the user to select an alignment procedure. If the user desires to align the telescope with regard to two user defined celestial objects, the user may scroll through the alignment to the two star alignment option and press the enter key 113.

The system next prompts the user to point the telescope to the North, in order to zero the azimuth axis position encoders, after which the user depresses the enter key 113 to inform the system the telescope tube is in its appropriate azimuth position. Next, the system prompts user to level the telescope by adjusting the telescope's altitude position until the altitude (or declination) setting circle is set to 0°, thus zeroing the altitude motor position encoders. As was described previously, all subsequent motion of the telescope away from this pre-set 0,0 position, allows a telescope system to directly calculate its altitude and azimuth displacements from the 0,0 reference point. The user is then prompted to scroll through an alphabetized stellar object database listing and select a particular star from the list by depressing the enter key 113. Again, once a particular user defined star is identified, the system controller automatically slews the telescope to the vicinity of that star. When slewing is complete, the user is prompted to center that star in the field of view of the eyepiece using the position keys and, when the star is centered, the user depresses the enter key. The user is then prompted to scroll through the alphabetized stellar object data base listing and select a second particular star from the list. Again, the enter key is depressed indicating that the user has selected the second star. Once again, the system controller automatically slews the telescope to the vicinity of the star after which the user is again prompted to center that star in the field of view of the eyepiece using the position keys. When the second star is centered the user depresses the enter key and the system controller calculates the absolute position of the telescope system with respect to the night sky.

Once the absolute position of the telescope system with respect to the night sky is determined, the system microprocessor 121 is easily able to calculate the path of any given celestial object through the sky and to develop the appropriate motor motion commands in accordance with the above-mentioned drive rate equations, such that an Alt-Az telescope system can smoothly and accurately track the object, i.e., "stops the sky" in software. A celestial object's motion through the sky will, necessarily, be calculated in terms of its rate of change in both altitude and azimuth as a function of time. Thus, for a given time period, the system microprocessor 121 is able to calculate the incremental motor step or "tick" rates required to be executed by the motor assembly so as to allow the telescope to track the object as it moves through the sky.

With regard to the foregoing alignment systems described in connection with the procedural flow charts of FIGS. 10*a*, 10*b* and 10*c*, it should be noted that the system controller calculates the telescope's position by mapping the telescope's Alt-Az coordinate system (Cartesian coordinate system) to the RA and Dec spherical coordinate system defining the night sky (the celestial sphere). In particular, the system controller reads the telescope's altitude and azimuth angular positions, when pointed at the selected star or stars, by reading the altitude and azimuth motor position encoder values when the user depresses the enter key after each star has been centered in the telescope eyepiece. From the telescope pointing angles thus defined, the system controller calculates the telescope's Cartesian position vectors and resolves each position vector into a matrix of direction cosines. The Cartesian coordinate matrix is mapped into a similarly defined matrix of the direction cosines of the star or stars expressed in terms of the celestial coordinate system, using well understood mathematical techniques involving matrix manipulation and rotation. The matrix of celestial direction cosines is generated by evaluating the RA and Dec coordinates of the star or stars identified by the user during the selection procedures.

It will be evident to those familiar with the mathematical arts that once the same two points are identified in two different coordinate systems, those two coordinate systems can be mathematically mapped to one another such that any further coordinates expressed in one coordinate system are easily expressed in the other coordinate system through a mathematical transform. Thus, once the telescope system is aligned with respect to the celestial sphere, further observations may be made by merely expressing the location of a desired object in terms of its celestial coordinates. The system controller understands the relationship between the celestial coordinate system and the telescope's altitude and azimuth coordinates, makes the proper mathematical transformation and drives the altitude and azimuth motors appropriately to point the telescope at the desired celestial position.

Once a telescope is "aligned" by use of one of the above-described alignment procedures, the user might wish to further refine the alignment accuracy of the telescope system by refining the Cartesian coordinate matrix defining the telescope's altitude and azimuth position vector. As is well known in the art, certain corrections must be applied to a celestial object's mean catalog of position in order to reduce it to the object's apparent position in the night sky. When an observer plans an evening's observations, the observer typically obtains an object's RA and Dec coordinates from an ephemeris or catalog which defines the object's position in terms of the coordinate system of a standard epoch. This is the mean position of the object. However, the standard epoch is generally different than the epoch at the time of observation. In addition, the object's catalog position does not include corrections for certain positional errors which depend upon the observation time and the particular location of the observer. Thus, the catalog position does not define precisely where the observer would likely find the desired object. Since the telescope's system controller operates on an object data base which defines celestial objects according to their mean position taken from a catalog, the mean coordinates must be converted to apparent coordinates before commands are sent to the telescope's altitude and azimuth motors, in order that an object may be precisely acquired and tracked.

The corrections that must be applied to a catalog mean position in order to reduce it to apparent position are listed in the following table, in order of decreasing size.

TABLE 1

| Correction | Approx. Magnitude |
|---|---|
| Precession | 40' of arc. |
| Refraction | 30' of arc. |
| Annual Aberration | 20" of arc. |
| Nutation | 17" of arc. |

TABLE 1-continued

| Correction | Approx. Magnitude |
|---|---|
| Solar Parallax | 9" of arc. |
| Stellar Parallax | 1" of arc. |
| Orbital Motion | 1" of arc. |
| Proper Motion | 0.5" of arc. |
| Diurnal Aberration | 0.3" of arc. |
| Polar Motion | 0.1" of arc. |

Not all of the listed corrections need be applied, only those corrections larger than the required pointing accuracy of an observation. Typically, only precession and refraction corrections need be made.

Additional sources of systematic error come from certain mechanical errors introduced by imperfections in the telescope mount, the motor and drive train system, the servo feedback system and imprecisions in leveling the telescope. Mechanical corrections that should be considered when precisely aligning the telescope system are listed in the following table.

TABLE 2

Encoder Zero Offset
Azimuth Axis Tilt (Alt-Az Mounts)
Polar Axis Misalignment (Equatorial Mounts)
Axis Non-orthogonality
Collimation Error
Tube Flexure
Mount Flexure
Gearing/Bearing Error
Drive Train Torsion Error These corrections are computed in a manner that can be used with any telescope of a particular mounting type, but the values of the error parameters are unique to each individual telescope system, since they are characteristics of that system. For example, in closed loop systems, the position feedback encoders provide a numerical value corresponding to the angular position of an axis. This numerical value is converted to a meaningful coordinate, such as RA, Dec, altitude or azimuth, by applying a calibration algorithm to the raw encoder data. These encoder zero offset corrections are incorporated into the calibration algorithm in order to provide numerical values representing the true position of the telescope. The system controller compares the apparent position of the desired object with the position of the telescope (determined from the position encoder readings) and generates appropriate movement commands to the motors in order to minimize the difference between the object and telescope positions.

Each of the astronomical and mechanical error sources are dealt with in precisely the same manner as initial telescope orientation. Once the telescope has been "aligned" the user may slew to a next object in order to begin observation. If the next object is not precisely centered in the telescope eyepiece, or if the next object drifts from the center of the eyepiece during tracking, the user may manually reposition the telescope using the position keys and commands the system to re-sync to the object's new position. The minor corrections, thus made, form the basis for a refinement of the Alt-Az position matrix which is then mapped into the celestial coordinate system. As further celestial objects are evaluated, the matrix is further refined to account for finer and finer error sources. Although capable of such further accuracy definition, it will be understood that the system according to the invention is able to account for, at least, the first two major mechanical error sources during the initial orientation procedure. Certain astronomical corrections are defined by well understood mathematical algorithms and can be easily incorporated into the orientation procedure. Thus, the pointing and tracking ability of the telescope system according to the invention is deemed sufficiently accurate for deep-sky observations and astrophotography following the alignment procedures set forth in connection with FIGS. 10a, 10b and 10c.

Figure 11A:
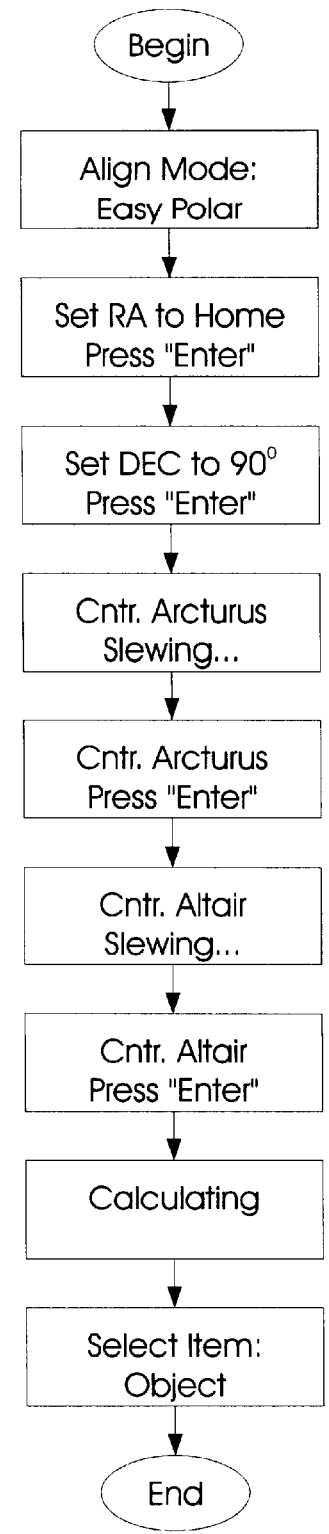
FIG. 11a is a conceptual flow diagram of a first, "easy" polar alignment and orientation procedure in accord with the invention.
Figure 11C:
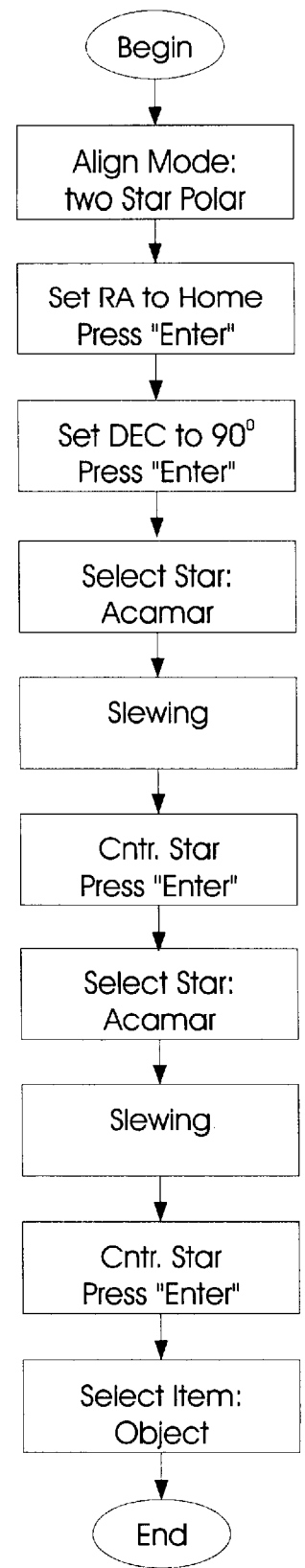
FIG. 11c is a conceptual flow diagram of a third, two-star, polar alignment and orientation procedure in accord with the invention.

Since the system controller is operable to define telescope alignment and movement with respect to a polar (equatorial) mount configuration, it is now appropriate to discuss alignment procedures associated with an equatorial mount in connection with the procedural flow charts of FIGS. 11a, 11b and 11c. Each of the polar alignment procedures first requires that the polar configuration and alignment mode is chosen by a user during system initialization as described in connection with the initialization procedure flow chart of FIG. 12. Needless to say, it is also necessary to that the telescope mount be configured as an equatorial mount and that the user properly adjusts the telescope's declination axis such that the declination axis is perpendicular to the mount's declination plane and that the celestial pole (North or South depending upon the observer's hemisphere) falls on the mount's declination plane.

Turning now to FIG. 11a, an "easy" polar alignment procedure is described. Specifically, when the "easy" alignment procedure is selected from the menu, the system prompts the user to point the telescope (using motion keys 112) along the RA axis until the telescope is pointed to the horizon (RA home position). The user then depresses the enter key 113 to inform the system that the telescope tube is in its appropriate RA position. Next, the system prompts the user to move the telescope until the declination setting circle reads 90°. Putting the telescope in a home position with regard to both RA and Dec functions to zero-in the position encoders of the declination and right ascension motors. Any subsequent of the telescope away from its 0,0 position allows the telescope system to directly calculate its right ascension and declination displacement from the 0,0 reference point.

After the previous steps are completed, the remainder of the "easy" polar alignment procedure is identical to the "easy" Alt-Az alignment procedure described in connection with FIG. 10a. In particular, using the time and data entries provided by the user, the telescope system consults a data base of well known celestial objects and selects a particular bright object which is currently above the horizon; the system automatically slews the telescope to the vicinity of that star by commanding the appropriate motion from the right ascension and declination motors; prompts the user to center the star in the field of view of the telescope eyepiece and uses the observer's manual position adjustments to refine its orientation algorithm. The process is repeated for a next star which, when centered by the observer, allows the system to calculate the precise position and orientation of the telescope with respect to the night sky (the celestial sphere).

As was the case with the Alt-Az configuration, a truncated, one-star, alignment procedure is provided to support an equatorial mount configuration and is depicted in the procedural flow chart of FIG. 11b. As with the previous case, a user is prompted to zero-in the motor position encoders by commanding the telescope to move to its RA and Dec home positions. The user then selects a particular star from an alphabetized stellar object data base list and may press the enter key 113, causing the telescope to automatically slew to the vicinity of that star. The user then centers the star on the field of view of the eyepiece by depressing the position keys 112 as required. Once the chosen star is centered in the field of view of the eyepiece, the user again presses the enter key 113 and the telescope is deemed aligned for a night of viewing.

A two-star alignment procedure is depicted in the procedural flow chart of FIG. 11c, in which the user is again prompted to move the telescope to the RA and Dec home positions and align the telescope by sequentially selecting two stars from an alphabetized stellar object data base list. As each star is selected, the telescope system automatically slews to the vicinity of that star, following which the user centers the star in the field of view of the eyepiece using the position keys 112 as required, and depresses the enter key 113 in order to inform the system that the desired star is centered.

Following definition of the home position, and following entry of either one or two stars in accordance with the above procedures, the telescope system calculates the telescope's position with relation to the night sky. Since the telescope mount comprises an equatorial configuration, the computation algorithm is simplified somewhat since the system need not convert coordinate systems, from, for example, Alt-Az to equatorial. Since an equatorial mount maneuvers in accordance with a spherical coordinate system defined by RA and Dec, all that is required to orient the telescope is a simple rotation of the telescope spherical coordinate system into the celestial coordinate system. The rotation is made about the telescope's RA and Dec axes in accordance with well established mathematical principles which need not be discussed further herein.

Following orientation, the equatorially configured telescope system is now able to acquire and track selected celestial objects by appropriate motion commands to its right ascension and declination motor assemblies. Once a selected celestial object is acquired, tracking is effected simply by commanding the right ascension motor assembly to move the telescope about the corresponding right ascension axis at the sidereal rate in the desired direction. No further commands need be given the declination motor assembly unless the user desires to acquire a different celestial object or, alternatively, the user desires to more precisely and accurately align the telescope system to compensate for some slight originally unaccounted for error.

Returning now to FIG. 6b, the system microprocessor 121 receives user I/O information, as provided by the system I/O microcontroller 122 and performs any needed data processing under application software program control. Data processing typically results in some form of desired telescope motion. The system microprocessor 121 is able to calculate the direction and extent of any required motor motion and is further able to direct the appropriate motor assembly to take the required action by passing the appropriate command through the system I/O microcontroller 122. Motor motion commands are substantially the same as those described in connection with the embodiment of FIGS. 5a and 5b and are provided to the system I/O microcontroller 122 over a two-wire serial clock and data bus 133. Certain commands are passed through the microcontroller 122 and are issued directly to the motor by the system microprocessor. Such commands typically include the step rate commands, the error count commands, the set and find LED position commands, and the like. Certain other information, typically read data, is held and processed by the system I/O microcontroller 122 for use by the microprocessor when it so desires.

Notwithstanding the foregoing discussion of telescope orientation and alignment, it will be evident to one having skill in the art, that major simplifications can be made to a telescope orientation and alignment procedure by incorporating additional component devices that are able to automatically provide an indication of the orientation of the telescope tube with respect to the compass, i.e., north-south sensing, an automatic indication of axial tilt, i.e., telescope level, and an automatic indication of absolute position and time. Pertinent to alignment and orientation simplification is the realization that electronic compasses, based on magnitoresistive sensors are able to electrically resolve a position orientation using the earth's magnetic field, to an accuracy of approximately ½ degree and with a resolution of about 0.1 degrees. As is well understood by those having skill in the art, the earth is surrounded by a magnetic field which has an intensity of from about 0.5 to about 0.6 gauss and includes a component parallel to the earth's surface that always points towards magnetic north. This feature of the earth's magnetic field forms the basis for all magnetic compasses and it is the components of this field, parallel to the earth's surface, better used to determine compass direction.

In particular, a type of magnetic sensor, termed a magnitoresistive sensor (MR) is constructed of thin strips of a nickel iron (NiFe) magnetic film, also termed permalloy, whose electrical resistance properties vary with a change in an applied magnetic field. MR sensors have a well defined axis of sensitivity, respond to changes in an applied magnetic field as little as 0.1 milligauss, have a response time of less than 1 microsecond and are generally commercially available as packaged integrated circuits. MR sensors are thus particularly suitable for use in a north-south sensing apparatus coupled to the telescope system of the exemplary embodiments.

Figure 17:
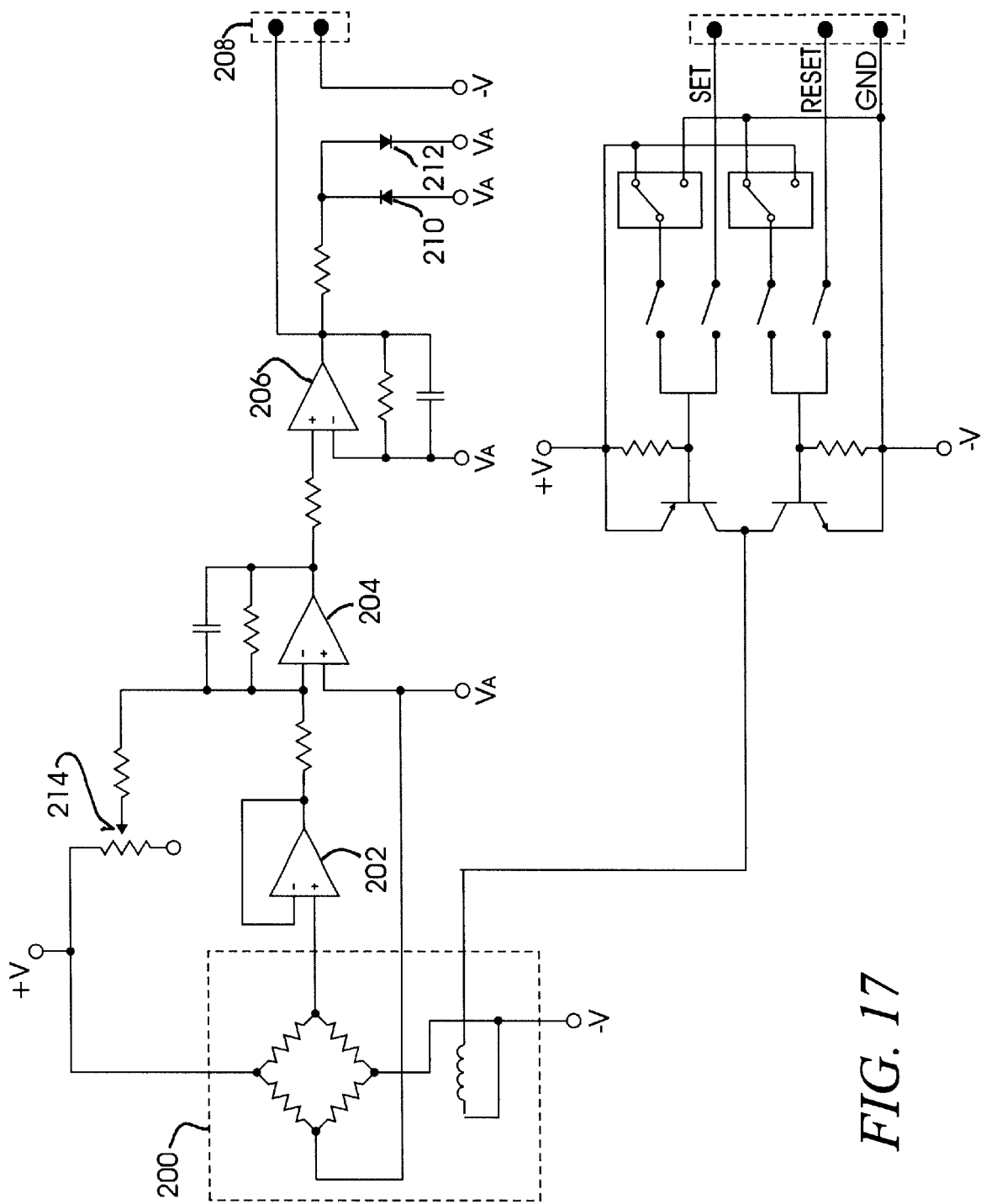
FIG. 17 is a simplified schematic diagram of an MR sensor useful in practice of the present invention.

One such configuration is shown in FIG. 17 which is a semi-schematic circuit diagram of a north-south sensor system, in accordance with the invention, that incorporates an MR sensor, implemented as an HMC 1021S, manufactured and sold by Honeywell, Inc. of Plymouth, Minn. The MR sensor 200 is a magnitoresistive sensing element constructed of NiFe thin films deposited onto a silicon substrate in a manner to define a Wheatstone resistor bridge. The MR sensor 200 further incorporates a current strap which is used to electrically "set" or "reset" the polarity of the device output and further allows a compensating offset field to be applied to the sensing elements to compensate for ambient magnetic films. A supply voltage is coupled to the MR sensor and causes a current to flow through the magnitoresistors comprising the Wheatsone bridge configuration. A crossed applied field causes magnetization in two of the oppositely placed resistors to rotate towards the current, resulting in an increase in the corresponding resistance. In the remaining two oppositely-placed resistors, magnetization rotates away from the current resulting in a decrease in the resistance.

Current passing through two of the arms of the Wheatstone bridge is taken from the MR sensor at two outputs, one of which is applied to the non-inverting input of an operational amplifier 202 configured as a voltage follower. The second output is applied to the non-inverting input of a second operational amplifier 204, the inverting input of which is coupled to receive the output of the voltage follower 202. The output of the second operational amplifier 204 is directed to the non-inverting input of a gain stage 206 which, in turn, drives an output pin 208 to give an indication signal as to whether or not the MR sensor is aligned with the earth's magnetic field. In operation, the gain stage 206 is configured so as to output a signal if the current from the MR sensor's two outputs is unbalanced, i.e., indicating that the sensor is not aligned with the earth's magnetic field. As the center comes into alignment with the field, current through the oppositely-placed resistor arms becomes balanced, resulting in the second operational amplifier 204 having a null output. Gain stage 206, in turn, outputs a null signal indicating that the MR sensor is aligned with the earth's magnetic field, i.e., pointing towards magnetic north.

As a further indication of whether or not the MR sensor is pointing towards magnetic north, two light emitting diodes 210 and 212 are coupled, in parallel fashion, to the output of the gain stage 206. A first light emitting diode (LED) 210 is reverse coupled to the output of the gain stage 206. By reverse coupled, it is meant that the negative side of the diode is coupled to the output, while the positive side is coupled to a reference potential, such as ground. A second diode 212 is coupled in forward fashion to the output of the gain stage 206. In combination, the diodes function to give an indication as to the alignment of the MR sensor with earth's magnetic field. When the sensor 200 is misaligned in one direction, the gain stage output will be either positive or negative, depending on whether the sensor is mis-aligned to the "left" or "right" of a centerline indicating the direction of magnetic north. When the sensor is mis-aligned to one direction, the gain stage output might be negative, in which case the first LED 210 (the negatively coupled LED) will conduct current, thereby emitting light. If the MR sensor 200 is misaligned in the opposite direction, the gain stage 206 will output a positive signal, causing the positively coupled LED 212 to conduct, lighting-up in turn. When the sensor is aligned to magnetic north, the gain stage output is nulled and both LEDs are off.

It should be noted, that since these are diodes, there is a forward voltage drop associated therewith which limits their precision in indicating magnetic north precisely. Depending on the value of the forward voltage drop of the LEDs 210 and 212, the MR sensor has a slight range about true north during which time the gain stage 206 will not develop a sufficient output signal to activate either the forward or reverse biased LED. However, even within this "uncertain" range, the gain stage 206 is outputting a signal to the output pin 208 which is able to be evaluated by either an intelligent system control unit (100 of FIGS. 6a and 6b) or an integrally coupled PIC processor of the type described above.

It bears mentioning further that the MR sensor system is able to be calibrated by a zero adjustment circuit 214 which is coupled to the inverting input of the second operational amplifier 204. Zero adjustment circuit 214 is provided in order to compensate for the input offsets commonly exhibited by almost all operational amplifiers, and suitably comprises an adjustable resistor coupled between positive and negative supply voltages with a center tap defining the zero adjustment connection to the inverting input of the operational amplifier 204. In operation, the sensor is precisely aligned with the earth's magnetic field in a manufacturing jig and the variable resistor is adjusted until such time as the gain stage 206 defines a null output signal. This indicates that the overall circuit is now balanced with circuit offsets compensated for.

Further, the sensor circuit suitably includes a set/reset circuit, suitably configured as a current pulse generator, which is used to eliminate the effects of past fail hystoresis and which can electronically set or reset the polarity of the output by applying an appropriate set or reset signal.

The MR sensor arrangement depicted in FIG. 17 has particular utility when configured on a small printed circuit board and mounted on a telescope tube in such a manner that the position axis of the center is aligned with the long axis of the telescope. Therefore, when the MR sensor is aligned with the earth's magnetic field so as to indicate magnetic north, the telescope tube is also positioned with its optical axis aligned towards magnetic north. The sensor's output 208 is coupled to the auxiliary input of the electrical interface (30 of FIGS. 3a and 3b) and is thereby made available to system processing components as an automatic direction indication signal. In this manner, there is no longer any need for a user to manually align the telescope to point towards north. Once the automated telescope system is turned on, an application routine automatically slews the telescope back-and-forth in the horizontal direction and examines the "sense" of the output of the sensor. Once the automated system detects that the sensor is aligned correctly with north, i.e., senses a null output, the automated telescope system evaluates the position of the motors and initializes the azimuth motor assembly.

While the discussion above has concerned itself with a description of how an MR sensor system is configured to align its self with the earth's magnetic field, i.e., give an indication of magnetic north, it should be noted that the sensor can be configured to give an indication of its alignment with respect to true north. In this particular instance, the sensor system is aligned with true north in a manufacturing jig and the zero adjustment circuit 214 is adjusted such that the gain stage 206 outputs a null indication. It should be understood that the currents in the oppositely-disposed arms of the Wheatsone bridge will necessarily be unbalanced, but the zero adjustment circuit 214 is adapted to compensate for this misadjustment as well as compensate for any offsets developed by the operational amplifiers 202 and 204.

It is also quite within the contemplation of the present invention to use an MR sensor in a 3-axis mode in order to eliminate axial tilt concerns by electronically dealing with any axis non-orthogonality. In this implementation, an additional MR sensor is provided which is aligned in a plane orthogonal to the plane of the horizontally disposed MR sensor. The additional MR sensor is configured to measure the vertical portion of the US magnetic field, i.e., the angle of the magnetic field to the surface of the earth. Errors introduced by axial tilt can be quite large depending on the magnitude of the dip, or inclination, angle.

An additional method that might be used to correct for axial tilt is to incorporate an inclinometer, or tilt sensor, with the MR sensor in order to electrically define any mount offsets due to mount pitch. When an inclinometer, or tilt sensor, is incorporated with the MR sensor, the telescope system is provided with a fully automated, electronic methodology for 3-axis sensing. This allows the telescope system to automatically adjust itself to a level condition as well as automatically adjusting itself to align with either true or magnetic north. Once these alignments are made, the axis encoders of the motor systems are automatically initialized in order to compensate for the mount alignment parameters. Therefore, electronic sensors coupled to the telescope tube provide a very repeatable position index when in proximity with the mount's axis crossings. Electronic sensors are used as fixed point high-resolution devices, with fine positioning being provided by the motor encoders. Since pointing accuracy typically depends on the flexure characteristics of a tube, the mechanical stability of the tube and mount combination and the quality of the gearing between the drive motor and a telescope mount, it will be understood that pointing accuracy can be simply and easily added to a inexpensive telescope system that might exhibit a certain mechanical looseness.

As was developed above, in order to completely align a telescope system, the user or an intelligent telescope system need only know the direction of north, the inclination of the horizon (level), the time and date and its position on the earth's surface. If these quantities are known, there is no further information that need be provided to any telescope system to allow it to thereafter point to any designated object with a known ephemeris, other than an command to do so. Time and date information are accessible by receiving a broadcast signal, WWV, which is made available for such purpose. The automated telescope system according to the invention fully contemplates being able to couple a source of WWV information into the intelligent system control unit so that the control unit is able to continually update date and time information such that the time and date variables of the alignment system are eliminated. WWV is in Fort Collins, Colo. and broadcasts continuous time and frequency signals on 2.5, 5, 10, 15 and 20 MHz. All frequencies provide the same information, with frequencies above 10 MHz working best during daylight hours, while lower frequencies working best at night. The beginning of each hour is identified by a 0.8 second long 1500 Hz tone, with the beginning of each minute identified by a similar length 1000 Hz tone. Second pulses are given by a 440 Hz tone the 29th and 59th second pulses of each minute being omitted. Time signals may be input directly from a WWV receiver, with the various frequency tones defining clock signals which can be processed by the intelligent system control unit to update its date and time information.

Alternatively, WWV information may be received via an Internet connection by a laptop-type personal computer system. Information processed by the laptop can be transferred to the intelligent system control unit over the auxiliary input bus of the interface panel in a manner as described above.

Accurate location information can be provided to the intelligent system control unit by use of a global positioning system (GPS) or differential global positioning system (DGPS) receiver configured with an NMEA interface. The NMEA interface is a well recognized interface protocol which can additionally be coupled to the auxiliary interface to provided a source of location information directly to the intelligent system control unit. Once the intelligent system control unit has location, time and date information available as well as the output of the "north" and "level" sensors, the intelligent system control unit becomes fully aware not only of its location but also of the spatial orientation of the telescope system to which it is coupled.

The systems and methods associated with 3-axis sensing, as described above, are equally applicable to additional "pointing" or "acquisition" devices beyond the novel telescope system in accordance with the invention. Indeed, 3-axis sensing systems are adaptable to be mounted on a detachable viewfinder or telescope eyepiece such that a user need only direct the eyepiece in accordance with the signals received from the sensing devices in order to orient themselves with both horizon and north. Binoculars and heads-up-display (HUD) goggles are also able to be configured with 3-axis sensing devices in the above manner in order to provide them with an orientation capability.

Figure 13:
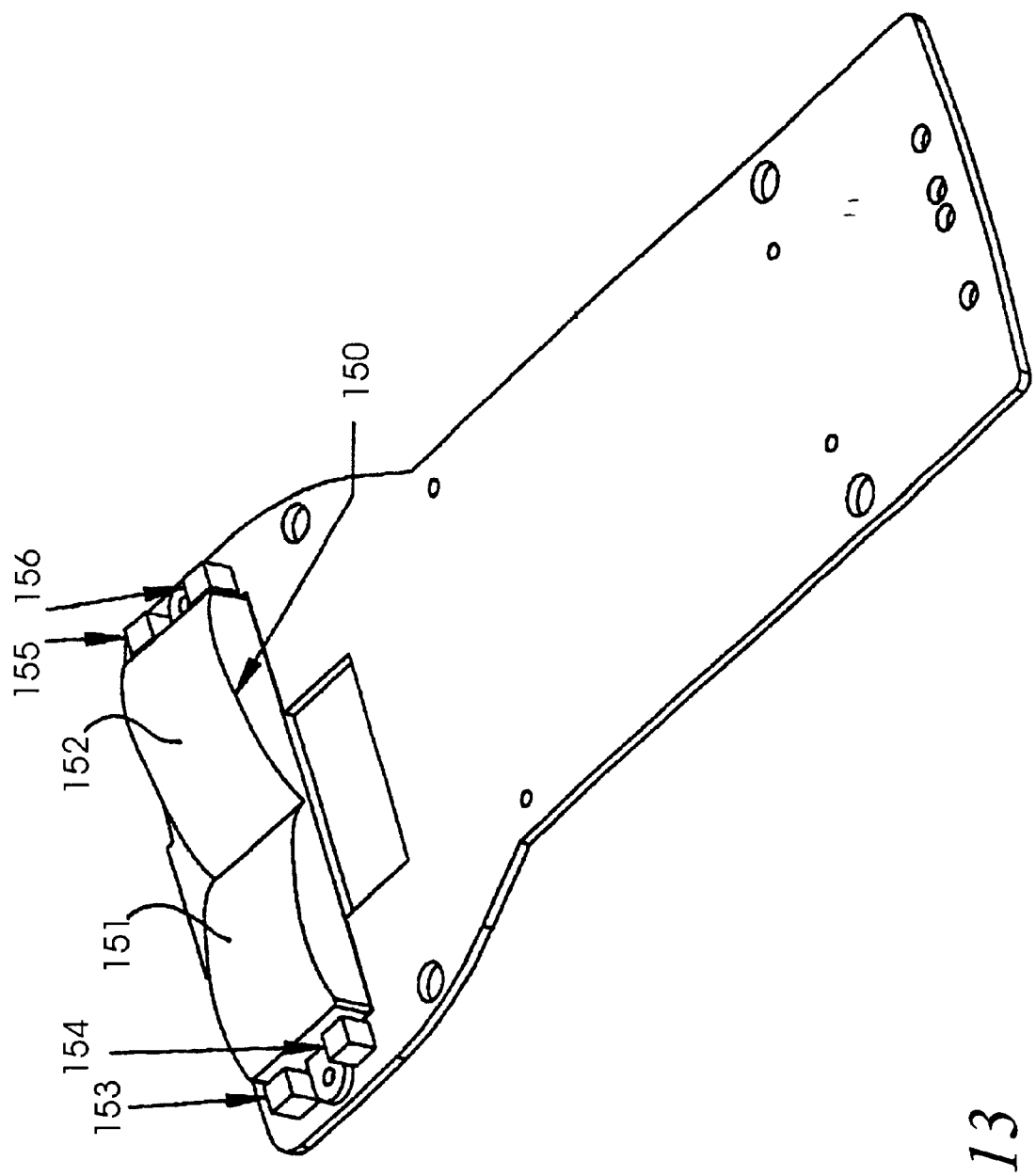
FIG. 13 is a simplified partial perspective view of a uniform illumination lightbox.

A further feature of the intelligent system control unit (100 of FIGS. 6a and 6b) is the construction of the light source for providing uniform illumination to the LCD display screen 102. With reference, now, to FIG. 13, a cusped, curvilinear optical light box 150 is disposed on the surface of the control unit's electronic component circuit board, and positioned in the region just beneath the LCD display screen, and having approximately the same footprint. The light box defines a generally rectangular, hollow enclosure, with its surface describing a pair of curvilinear arcs 151 and 152, laterally symmetrical about a central, downward projecting, cusp which bisects the surface. Illumination LEDs 153, 154, 155 and 156 are arranged, in pairs, along each of the short sides of the light box and are configured to shine into the enclosure, in the direction of the cusp.

Each of the curvilinear surfaces are rendered translucent, by painting them white, for example, or by constructing the reflector from a translucent material such as a suitable plastic. The translucent property of the surface allows the light developed by the LEDs to shine through the surface, but permits each arcuate portion to diffuse the light and direct it (as a backlight source) onto the LCD display in a diffusion pattern promoting uniform illumination.

In a conventional, flat-surfaced light box, light energy, from a non-coherent, uniform, source such as an LED, is scattered through the translucent surface only when the scattering vector of the light makes a relatively large angle with the surface in question. As the surface element is farther and farther away from the light source, the scattering angle becomes correspondingly smaller, until the light is scattered along the surface underside (perpendicular scatter vector) and very little is scattered through the material and onto the display (Normal scatter vector). This phenomenon results in a dark, or relatively unilluminated, region in the center of the display, while the edges are over illuminated (so called hot spots). This makes the display hard to read, particularly at night.

The curvilinear arcuate surfaces of the light box 150 according to the invention, are shaped to insure a substantially greater degree of normal scattering out of the light box at the light path extremities, i.e., the portion of the surface farthest from the light source (the center). Moreover, the gradual curvature of each surface maintains the surface at a relatively constant scattering angle with respect to the light source. Thus the light energy diffused through the surface is relatively constant along the surface in the direction from the light source towards the cusp. In the region of the cusp itself, surface reflection adds an additional component of illumination to the light directed onto the display. Light scattered from a first arcuate surface 151 at a low angle, is reflected from the second arcuate surface 152 at an equal angle and thus towards the display. Low angle surface scattering is therefore recovered to some degree and forms an additional component of illumination in the central region.

Figure 14:
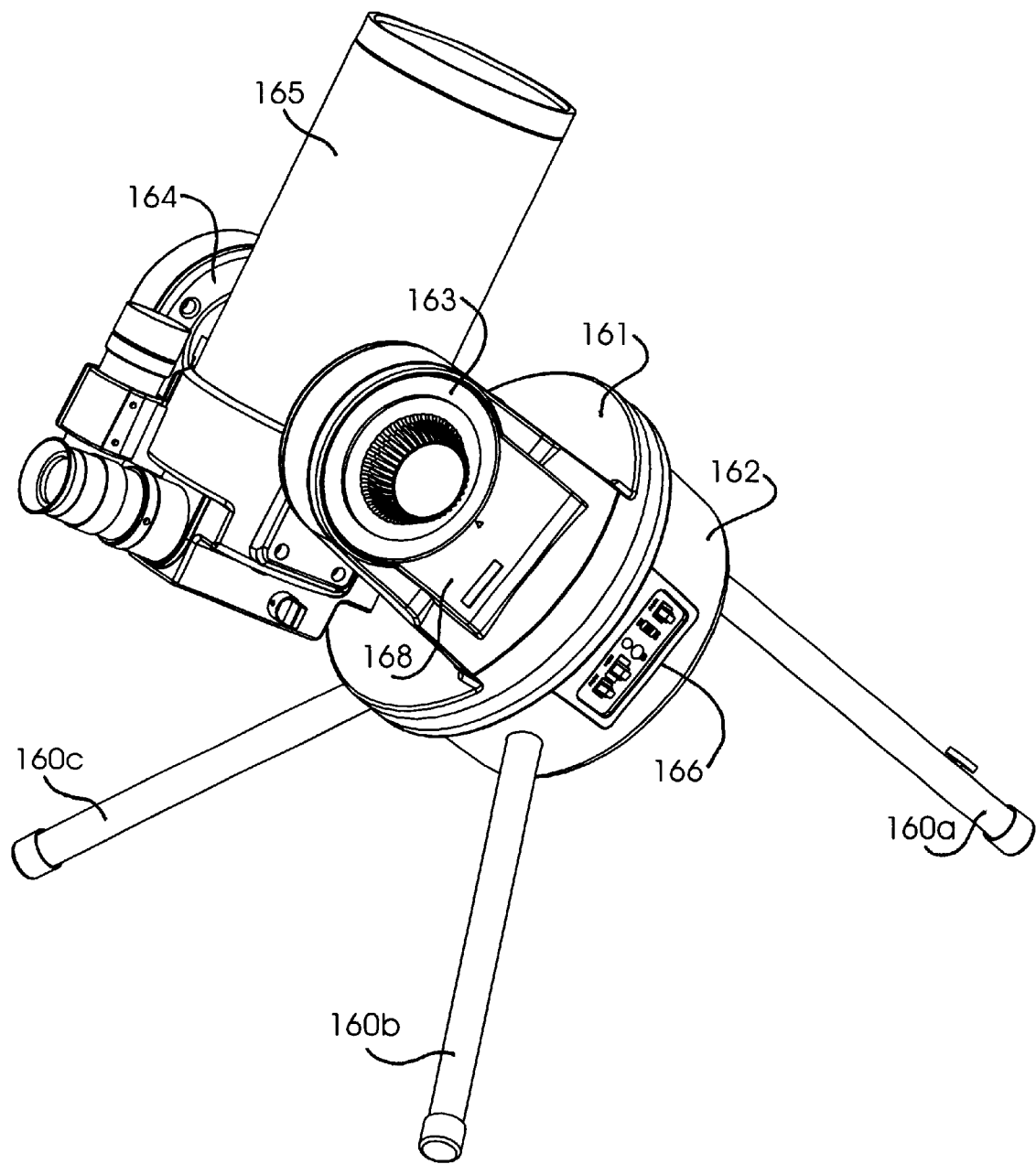
FIG. 14 is a perspective view of a second embodiment of a telescope according to the invention, having integrated motor assemblies.

It should be evident, from the foregoing discussion, that the various components and elements of the present invention are not limited to the particular telescope systems illustrated thus far. Indeed, the telescope and motor systems described in connection with the illustrated embodiments, were chosen because the novel components of the invention appeared externally and admitted of more direct identification. Turning now to FIG. 14, there is depicted a further embodiment of a fully automated telescope system, in which the motor assemblies are not configured as add-on components, but rather are integrated into the telescope system.

The telescope system of FIG. 14 is shown as configured to operate in equatorial mode, with its legs 160*a*, 160*b* and 160*c* positioned to equatorially align the telescope such that the top surface 161 of the base housing 162 rotates to define the system's RA plane. Right and left fork arms 163 and 164, respectively, support the telescope tube 165 and provide its declination rotation axis. The base housing 162 additionally supports an interface panel substantially similar to the interface panel 30 of FIGS. 1, 2, 3*a* and 3*b*, but without the serial interface connections to the Alt (Dec) and Az (RA) motor assemblies. Rather, the interface panel 166 provides for plug-in connection of either of the previously described control units, and for plug-in connection of a multiplicity of auxiliary devices through an auxiliary bus.

Motor assembly coupling connections are not required for the embodiment illustrated in FIG. 14, since the motor assemblies are incorporated into the telescope structure. Thus, external connections are not required. However, electrical connection to the motor assemblies is made via an identical 2-wire serial interface as with previous embodiments, except that the motor interface busses are internalized into the telescope structure as well.

Figure 15:
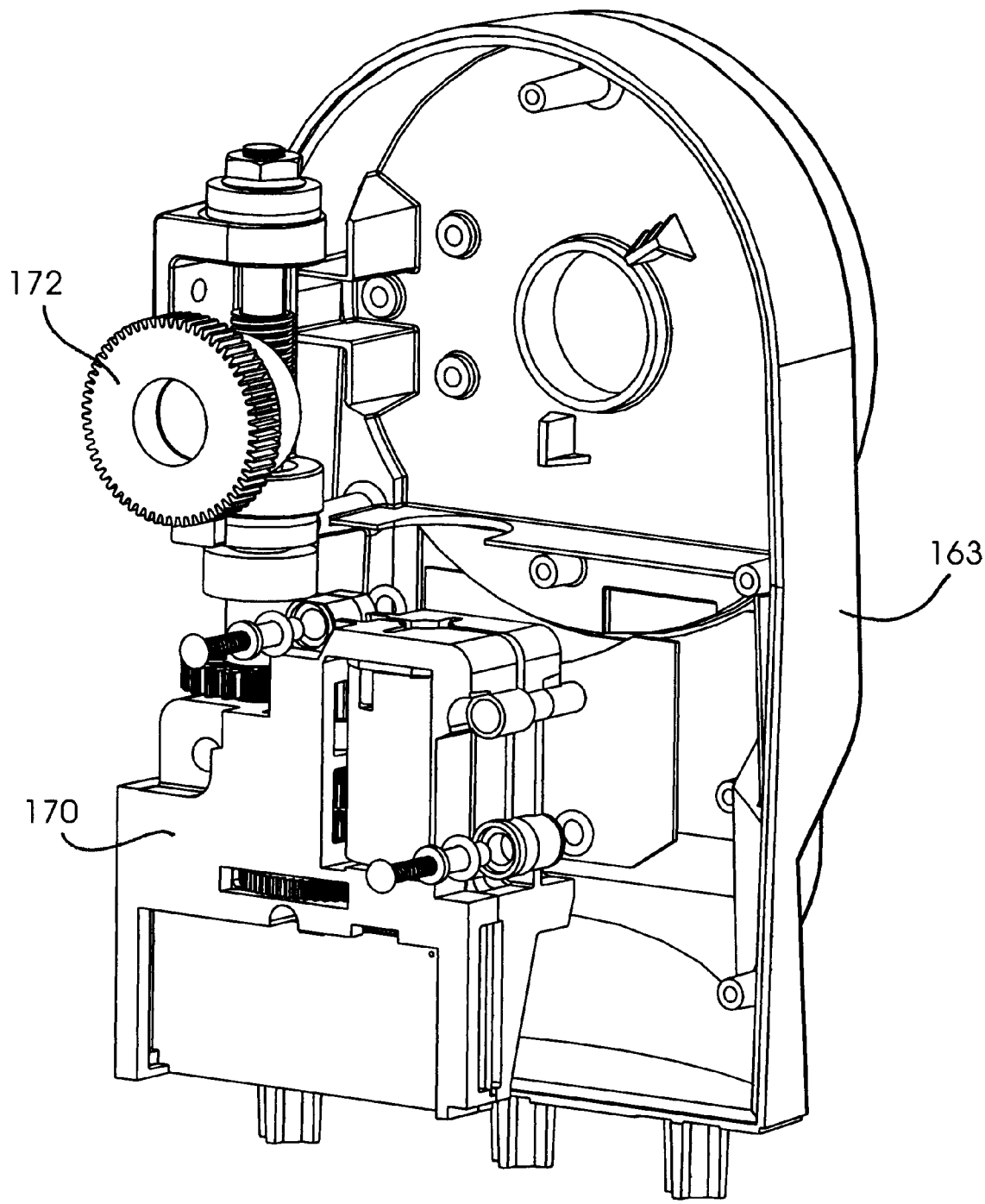
FIG. 15 is a simplified, exploded, partial perspective view of a declination (altitude) motor assembly integrated into a fork arm of the telescope of FIG. 14.

A first, declination (or altitude) motor assembly is configured into a motor enclosure 168, formed by in the hollow interior of one of the fork arms; the right fork arm 163 in the illustrated embodiment. FIG. 15 depicts the internal configuration of the fork arm 163 and illustrates the position of a declination (Alt) motor assembly 170 and its associated gear train 172 within the fork arm.

Figure 16:
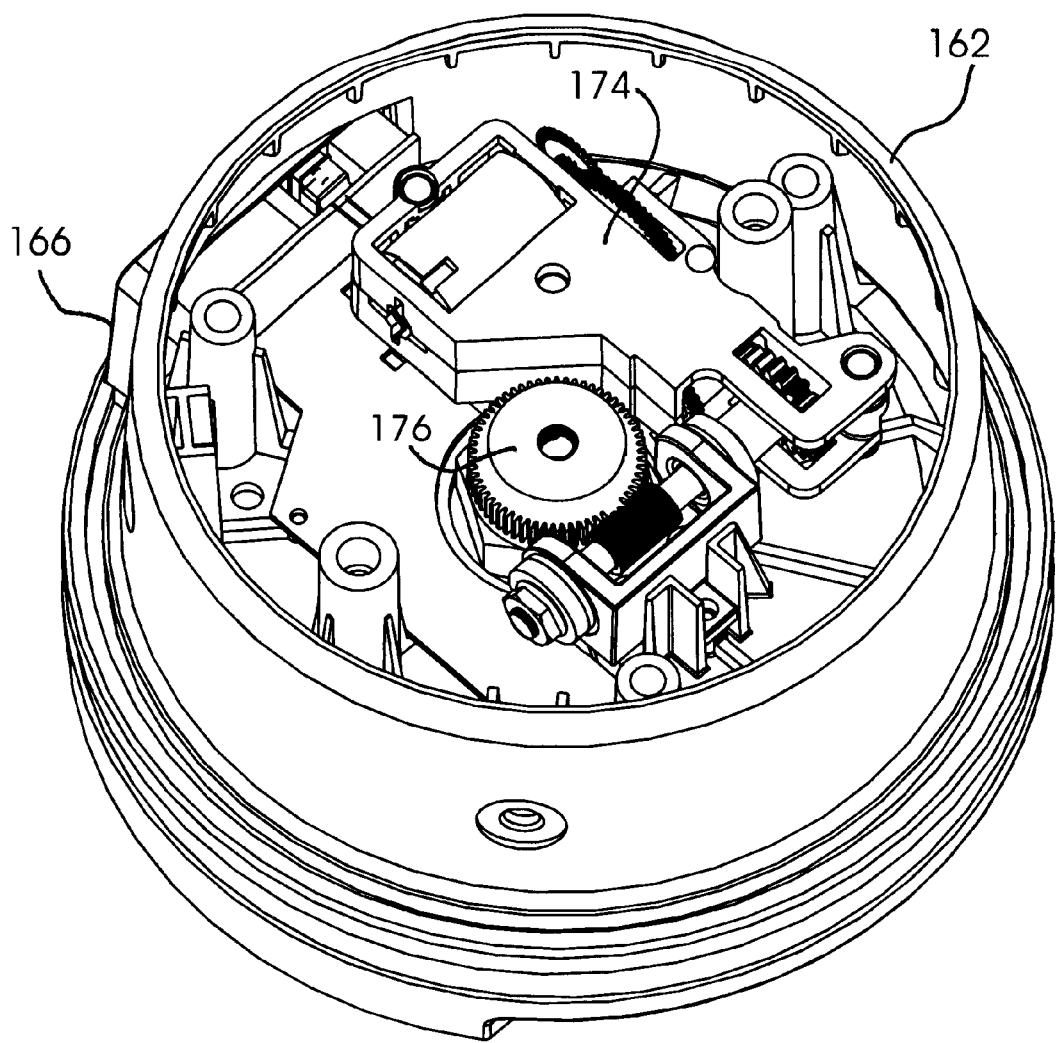
FIG. 16 is a simplified, partial perspective view of a right ascension (azimuth) motor assembly integrated into the base housing of the telescope of FIG. 14.

A second, right ascension (or azimuth) motor assembly is configured to fit within the base housing 162 of the telescope system, in a manner depicted in FIG. 16. The RA (Az) motor assembly 174 and its associated gear train 176 are disposed in a hollow enclosure formed just beneath the RA surface 161 of the telescope. Direct DATA, CLK, power and ground couplings are taken from hardwired connections made between the control unit input of the interface panel 166 and each respective motor assembly. Each motor assembly 170 and 174 comprises the same electronic components as those described in connection with previous embodiments and are, therefore, endowed with the same degree of intelligence.

The telescope system embodiment of FIGS. 14, 15 and 16 may be controlled by either the semi-intelligent or fully intelligent control units described previously, with the same degree of functional performance. Moreover, the auxiliary bus supports the same numbers and types of auxiliary devices.

It should be understood, therefore, that distributing intelligence across various functional components of a telescope system, is not limited to the particular configuration of the telescope. Certain portions of the system may be integrated into the telescope in the interest of compactness and design efficiency without sacrificing any of the virtues of intelligence distribution. All that these integrated systems lack is the ability to be lobotomized to a purely mechanical system operated entirely by manual manipulation.

What is claimed is:

1. An automated telescope system of the type including a telescope mounted for rotation about two substantially orthogonal axes, the automated telescope system comprising:

first and second motor portions, each coupled to rotate the telescope about a respective one of the axes, each motor portion including:
a motor having a rotatable shaft;
an incremental encoder coupled to the motor shaft, the encoder outputting signals corresponding to an amount of movement of its respective motor; and
an intelligent motor control processor, comprising a position register, the register storing a calculated actual extent of motor movement, the motor control processor coupled to receive encoder signals from a respective incremental encoder, the intelligent motor control processor calculating and outputting motor control commands in operative response thereto; and a command processor operatively coupled to the motor portions, the command processor receiving an input representing a position of a desired viewing object, the position characterized in terms of a celestial coordinate system, the command processor further receiving an input representing a present position of the telescope, the telescope position characterized in terms of a rectangular coordinate system, the command processor calculating a rotational movement about each of the respective axes to move the telescope from its present position to the position of the desired viewing object and outputting each axial rotational movement to a respective motor control processor as motor movement commands;

wherein each motor control processor translates received motor movement commands into motor control commands, each motor control processor commanding motor movement and receiving encoder signals corresponding to actual motor movement, the motor control processor processing received encoder signals to calculate an actual extent of motor movement, and wherein each motor control processor provides its register contents to the command processor, the command processor translating the register contents into telescope angular displacement about the corresponding axis to calculate thereby a present telescope position.

2. The telescope system according to claim 1, wherein the signals output by the incremental encoder correspond to increments of the encoder, a timing between increments corresponding to a speed of movement and an amount of increments corresponding an extent of movement.

3. The telescope system according to claim 2, wherein the incremental encoder comprises an optical encoder operating in quadrature, the motor control processor processing the quadrature signal to determine motor speed and motor rotation direction.

4. The telescope system according to claim 3, wherein the motor control processor increments the position register with a received extent of movement when the motor rotates in a first direction and wherein the motor control processor decrements the position register with a received extent of movement when the motor rotates in a second direction.

5. The telescope system according to claim 1, further comprising:

a celestial object database coupled to the command processor, the database containing entries each associating a celestial object with a corresponding set of celestial coordinates; and wherein the command processor receives an input corresponding to a desired celestial object to view, the command processor accessing the corresponding set of celestial coordinates from the database, the command processor further processing the celestial coordinates and rectangular coordinates representing the present position of the telescope system so as to calculate a dynamic movement profile for each axis so as to track the desired celestial object's motion.

6. The telescope system according to claim 5, wherein the command processor translates each axis' dynamic movement profile into motor speed and direction commands and outputs said motor commands to the corresponding motor control processor, the motor control processor controlling motor movement in response thereto, thereby freeing the command processor to perform further processing and calculation tasks during telescope movement.

7. An automated telescope system of the type including a telescope mounted for rotation about an altitude and an azimuth axis, the automated telescope system comprising:

a command processor, the command processor receiving an input representing a position of a desired viewing object, the position characterized in terms of a celestial coordinate system, the command processor translating the input into a position characterized in terms of an altitude/azimuth coordinate system, the command processor calculating an amount of movement about each axis, to move the telescope from a present position to a desired position which points the telescope at the desired viewing object, the command processor outputting motor movement commands for each respective axis; and two intelligent motor portions, each coupled to rotate the telescope about a respective one of the axes, each motor portion including:

a motor having a rotatable shaft;

a motion indicator coupled to the motor, the motion indicator developing motion indication signals corresponding to actual motor movement; and an intelligent motor control processor, coupled to the motor and the motion indicator, the motor control processor further coupled to receive motor movement commands from the command processor, the motor control processor processing each respective motor movement command into motor control commands defining operational movement of the motor, the motor control processor further receiving motion indication signals and comparing actual operational movement of its respective motor to commanded operational movement, the motor control processor modifying motor control commands in response to differences therebetween, the motor control processor including a position regsister, the register storing a calculated actual extent of motor movement wherein the motor control processor provides the register contents to the command processor, the command processor translating the register contents into telescope angular displacement about the corresponding axis and thereby into a present telescope position.

8. The telescope system according to claim 7, wherein the motion indicator comprises an incremental encoder, the motion indication signals corresponding to increments of the encoder, a timing between increments corresponding to a speed of movement and an amount of increments corresponding an actual extent of movement.

9. The telescope system according to claim 8, wherein the incremental encoder comprises an optical encoder operating in quadrature, the motor control processor processing the quadrature signal to determine motor speed and motor rotation direction.

10. The telescope system according to claim 9, wherein the motor control processor increments the position register with an actual extent of movement when the motor rotates in a first direction and wherein the motor control processor decrements the position register with an actual extent of movement when the motor rotates in a second direction.

11. The telescope system according to claim 7, further comprising;

a geographic location database coupled to the command processor, the database containing entries each associating a geographic place name with a corresponding set of earth-based coordinates; and wherein the command processor receives a place name input corresponding to a geographic location proximate to a user, the command processor processing the corresponding set of earth-based coordinates and the contents of both motor controller's position registers so as to determine the present position of the telescope system with respect to the celestial coordinate system.

12. The telescope system according to claim 11, further comprising:
a celestial object database coupled to the command processor, the database containing entries each associating a celestial object with a corresponding set of celestial coordinates; and
wherein the command processor receives an input corresponding to a desired celestial object to view, the command processor processing the corresponding set of celestial coordinates and the present position of the telescope system so as to calculate an amount of altitude and azimuth axis movement sufficient to point the telescope to the desired celestial object, the command processor further calculating a dynamic movement profile for each axis so as to track the desired celestial object's motion.

13. The telescope system according to claim 12, wherein the command processor translates each axis' dynamic movement profile into motor speed and direction commands and outputs said motor commands to the corresponding motor control processor, the motor control processor controlling motor movement in response thereto, thereby freeing the command processor to perform further processing and calculation tasks during telescope movement.

14. In an automated telescope system of the type including a telescope mounted for rotation about two substantially orthogonal axes, a method for operating the system comprising:
retrieving an input representing a position of a desired viewing object, the position characterized in terms of a celestial coordinate system;
processing the input in a command processor into a position characterized in terms of a rectangular coordinate system, the command processor determining a present position about each axis, and calculating a displacement in the rectangular coordinate system for each axis to point the telescope at the desired viewing object;
processing each axial displacement into motor movement commands for that axis;
outputting each motor movement command to a corresponding motor control processor coupled to that axis;
processing each respective motor movement command, in each said respective motor control processor, into motor control commands defining operational movement of a motor coupled to each respective axis;
operating each motor in accordance with its motor control commands;
evaluating actual operational movement of each motor by a motion sensor, the sensor developing motion indication signals corresponding to an amount of motor rotational movement, the evaluating step including:
reading an amount of motor rotational movement;
calculating a total amount of motor movement;
recording the total amount as a content of a position register;
providing the register contents to the command processor, wherein the command processor translates the register contents into telescope angular displacement about the corresponding axis and thereby a present telescope position; and
wherein each respective motor control processor compares actual operational movement of its respective motor to commanded operational movement and modifies motor control commands in response to differences therebetween.

15. The method according to claim 14, wherein the motion sensor comprises an incremental encoder, the motion indication signals corresponding to increments of the encoder, a timing between increments corresponding to a speed of movement and an amount of increments corresponding an extent of movement.

16. The method according to claim 15, wherein the incremental encoder comprises an optical encoder operating in quadrature, the motor control processor processing the quadrature signal to determine motor speed and motor rotation direction.

17. The method according to claim 16, further comprising:
incrementing the contents of the position register with an extent of movement when the motor rotates in a first direction; and
decrementing the contents of the position register with an extent of movement when the motor rotates in a second direction.

18. The method according to claim 14, further comprising:
accessing a celestial object database coupled to the command processor, the database containing entries each associating a celestial object with a corresponding set of celestial coordinates; and
providing an input corresponding to a desired celestial object to view;
providing the corresponding set of celestial coordinates from the database;
retrieving the corresponding set of celestial coordinates and the present position of the telescope system so as to calculate an amount of altitude and azimuth axis movement sufficient to point the telescope to the desired celestial object;
calculating a dynamic movement profile for each axis so as to track the desired celestial object's motion;
translating each axis' dynamic movement profile into motor speed and direction commands; and
outputting said motor commands to the corresponding motor control processor, wherein the motor control processor controls motor movement in response thereto, thereby freeing the command processor to perform further processing and calculation tasks during telescope movement.

19. In an automated telescope system of the type including motors coupled to rotate the telescope about an altitude axis and an azimuth axis, a method for operating the system comprising:
activating a command processor, the command processor performing the steps of:
retrieving an input representing a position of a desired viewing object, the position of the desired viewing object characterized in terms of a celestial coordinate system;
calculating a present position of the telescope, the present position characterized in terms of a rectangular coordinate system;
calculating an amount of movement by the telescope, in said rectangular coordinate system, about each axis which will point the telescope at the desired viewing object;
translating a movement amount for each axis into a motor movement command for that axis; and
providing each axial motor movement command to a motor control processor coupled to operate that axis' respective motor;

operating an altitude and an azimuth motor control processor, each coupled to the respective axis, each motor control processor performing the steps of:

translating axial motor movement commands received from the command processor into motor control commands;

operating each axis' motor in response to its respective motor control commands;

receiving signals corresponding to actual motor rotational movement, said signals sensed by an incremental encoder coupled to the motor;

establishing a record of its respective motor's total rotational movement; and providing the record of each motor's total rotational movement to the command processor; and wherein the command processor translates each record into telescope angular displacement about the respective axis and, thereby the present position vector of the telescope.

20. The method according to claim 19, the command processor further performing the steps of:

calculating a dynamic movement profile for each axis so as to track the desired celestial object's motion;

translating each axis' dynamic movement profile into motor speed and direction commands for each axis; and outputting said motor commands to the corresponding motor control processor for that axis, wherein the motor control processor controls motor movement in response thereto, thereby freeing the command processor to perform further processing and calculation tasks during telescope movement.

21. An automated telescope system of the type including a telescope mounted for rotation about two substantially orthogonal axes, the automated telescope system comprising:

first and second motor portions, each coupled to rotate the telescope about a respective one of the axes, each motor portion including:

a motor having a rotatable shaft;

an encoder coupled to the motor shaft, the encoder outputting signals corresponding to an amount of movement of its respective motor; and a motor control processor, configured to receive encoder signals from a respective encoder, the motor control processor calculating and outputting motor control commands in operative response thereto, the motor control processor including a position register, the register storing a calculated actual extent of motor movement; and a command processor operatively connected to the motor portions, the command processor receiving an input corresponding to a position of a desired viewing object, The command processor further receiving an input corresponding to present position of the telescope, the command processor calculating a rotational movement about each of the respective axes to move the telescope from its present position to the position of the desired viewing object and outputting a corresponding motor movement command to each respective motor control processor;

wherein each motor control processor translates received motor movement commands into motor control commands, each motor control processor commanding motor movement and receiving encoder signals corresponding to actual motor movement, each motor control processor providing its register contents to the command processor, the command processor translating the register contents into telescope angular displacement about the corresponding axis to calculate thereby a present telescope position, the motor control processor processing received encoder signals to calculate an actual extent of motor movement.

22. The telescope system according to claim 21, wherein the input corresponding to a position of a desired viewing object is characterized in terms of a celestial coordinate system.

23. The telescope system according to claim 22, wherein the input corresponding to a present position of the telescope is characterized in terms of a rectangular coordinate system.

24. The telescope system according to claim 21, wherein the signals output by the encoder correspond to increments of the encoder, a timing between increments corresponding to a speed of movement and an amount of increments corresponding to an extent of movement.

25. The telescope system according to claim 24, wherein the incremental encoder comprises an optical encoder operating in quadrature, the motor control processor processing the quadrature signal to determine motor speed and motor rotation direction.

26. The telescope system according to claim 25, wherein the motor control processor increments the position register with a received extent of movement when the motor rotates in a first direction and wherein the motor control processor decrements the position register with a received extent of movement when the motor rotates in a second direction.

27. The telescope system according to claim 26, wherein the automated telescope system is of the type including a telescope mounted for rotation about an altitude and an azimuth axis.

28. The telescope system according to claim 21, further comprising:

a celestial object database coupled to the command processor, the database containing entries each associating a celestial object with a corresponding set of celestial coordinates; and wherein the command processor receives an input corresponding to a desired celestial object to view, the command processor processing the corresponding set of celestial coordinates and the present position of the telescope system so as to calculate an amount of altitude and azimuth axis movement sufficient to point the telescope to the desired celestial object.

29. The telescope system according to claim 28, wherein the command processor further calculates a dynamic movement profile for each axis so as to track the desired celestial object's motion.

30. The telescope system according to claim 29, wherein the command processor translates each axis' dynamic movement profile into motor speed and direction commands and outputs said motor commands to the corresponding motor control processor, the motor control processor controlling motor movement in response thereto, thereby freeing the command processor to perform further processing and calculation tasks during telescope movement.

31. The telescope system according to claim 30, further comprising:

a geographic location database accessible to the command processor, the database containing entries each associating a geographic place name with a corresponding set of earth-based coordinates; and wherein the command processor receives a place name input corresponding to a geographic location proximate to a user, the command processor processing the corresponding set of earth-based coordinates and the contents of both motor controllers' position registers so as to determine the present position of the telescope system with respect to the spherical coordinate system.

* * * * *